US012437471B2

(12) United States Patent
Singh et al.

(10) Patent No.: US 12,437,471 B2
(45) Date of Patent: Oct. 7, 2025

(54) PERSONALIZED USER ENGAGEMENT IN A VIRTUAL REALITY ENVIRONMENT

(71) Applicant: Adeia Guides Inc., San Jose, CA (US)

(72) Inventors: Gyanveer Singh, Bangalore (IN); Reda Harb, Issaquah, WA (US)

(73) Assignee: Adeia Guides Inc., San Jose, CA (US)

( * ) Notice: Subject to any disclaimer, the term of this patent is extended or adjusted under 35 U.S.C. 154(b) by 25 days.

(21) Appl. No.: 18/073,628

(22) Filed: Dec. 2, 2022

(65) Prior Publication Data
US 2024/0185514 A1  Jun. 6, 2024

(51) Int. Cl.
G06T 17/00 (2006.01)
G06F 3/01 (2006.01)
G06F 3/16 (2006.01)

(52) U.S. Cl.
CPC .............. *G06T 17/00* (2013.01); *G06F 3/013* (2013.01); *G06F 3/16* (2013.01)

(58) Field of Classification Search
CPC . G06T 17/00; G06T 19/00; G06F 3/16; G10L 13/00
See application file for complete search history.

(56) References Cited

U.S. PATENT DOCUMENTS

| 11,348,576 | B1 * | 5/2022 | Lynch | G10L 13/00 |
| 11,368,585 | B1 * | 6/2022 | Shiver | H04N 7/15 |
| 2014/0157327 | A1 | 6/2014 | Roberts et al. | |
| 2018/0189076 | A1 | 7/2018 | Liston et al. | |
| 2018/0300751 | A1 * | 10/2018 | Hammitt | G06V 30/19173 |
| 2019/0155481 | A1 * | 5/2019 | DiVerdi | G06T 19/20 |
| 2021/0365525 | A1 | 11/2021 | Halleen et al. | |
| 2022/0083307 | A1 * | 3/2022 | Tyurin | G06F 3/1454 |
| 2023/0394530 | A1 * | 12/2023 | Sanchez | G06Q 30/0269 |

FOREIGN PATENT DOCUMENTS

| CA | 3199085 A1 | 4/2022 |
| KR | 102312015 B1 | 10/2021 |

OTHER PUBLICATIONS

Cyrusthegeek, "How To Watch Prime Video and Disney+ on Oculus Quest 2 V.R Headset", Mar. 13, 2022, Youtube, https://www.youtube.com/watch?v=tDmxzgfe1Aw (Year: 2022).*
Bigscreen, "Getting started with Bigscreen & Quest 2", Oct. 20, 2020, Youtube, https://www.youtube.com/watch?v=2Dmxv04EdTs (Year: 2020).*

(Continued)

*Primary Examiner* — Abderrahim Merouan
(74) *Attorney, Agent, or Firm* — HALEY GUILIANO LLP

(57) ABSTRACT

Systems and methods are described for generating a virtual reality (VR) environment comprising an interactive object, wherein the interactive object is associated with a service provider and is generated based on a user profile associated with a current VR session in the VR environment. The systems and methods may detect user input in association with one or more options associated with the interactive object, and, based on the detecting, cause an action to be performed in association with the user profile and the service provider associated with the interactive object, wherein the action comprises accessing a service provided by the service provider, the service being external to the VR environment.

20 Claims, 8 Drawing Sheets

(56) References Cited

OTHER PUBLICATIONS

KnowledgeBase "How to Get Amazon Prime Trial for Free & Cancel Without Getting Charged!", Jan. 2, 2020, Youtube, https://www.youtube.com/watch?v =-RX3t46CozU (Year: 2020).*

Sam Kieldsen, "What is Amazon Freevee? Your guide to the cost-free Prime Video alternative", Nov. 18, 2022, Stuff, https://www.stuff.tv/features/what-is-amazon-freevee-your-guide-to-the-cost-free-alternative-to-prime-video/ (Year: 2022).*

TechBasics, "How to Use Amazon Prime Video 2022? (Quick Beginners Turorial)", Sep. 15, 2022, Youtube, https://www.youtube.com/watch?v=K4U51_1CWFo (Year: 2022).*

Bhattcharya, "Beginner's Guide to Virtual Reality Ads," Single Grain (49 pages) (https://www.singlegrain.com/virtual-reality/virtual-reality-ads/).

Google Ad Manager Help, "Ad Manager and Ad Exchange program policies, Personalized and non-personalized ads," (https://support.google.com/admanager/answer/9005435?hl=en).

Levine, "Nat Geo and Verizon's Oath programmatically place ads in VR for 'Mars' series," (2018) (https://martech.org/nat-geo-and-verizons-oath-programmatically-place-ads-in-vr-for-mars-series/) (6 pages).

Meta Quest Blog, "Testing In-Headset VR Ads," Jun. 16, 2021 (4 pages) (https://www.meta.com/blog/quest/testing-in-headset-vr-ads/).

XR Today Team, "How Is VR Transforming Advertising?," Mar. 3, 2022 (12 Pages) (https://www.xrtoday.com/virtual-reality/how-is-vr-transforming-advertising/).

Zhu et al., "BlinKey: A Two-Factor User Authentication Method for Virtual Reality Devices," Proceedings of the ACM on Interactive, Mobile, Wearable and Ubiquitous Technologies, 4(4):164:1-29 (2020).

* cited by examiner

PERSONALIZED USER ENGAGEMENT IN A VIRTUAL REALITY ENVIRONMENT

BACKGROUND

This disclosure is directed to systems and methods for providing personalized engagement options in a VR environment. In particular, techniques are disclosed for causing an action to be performed in association with a user profile and a service provider associated with an interactive object in the VR environment.

SUMMARY

Advancements in media technology have led to the development of virtual reality (VR) technology. VR systems may fully immerse (e.g., giving the user a sense of being in an environment) or partially immerse (e.g., giving the user the sense of looking at an environment) users in a three-dimensional (3D), computer-generated environment. Adaptation of VR devices continues to increase, particularly as VR devices become less bulky and more user-friendly. Time spent by users in VR environments and/or the metaverse will continue to grow, as users will want to visit new, different places and even meet friends and family in the VR world or metaverse. In some circumstances, in a VR world, a user may be interested in content (e.g., a television show being shown in a virtual café or an advertisement for a TV show) or a service provider (e.g., Comcast or HBO) being used by a friend or may otherwise be interested in a product or service shown in the VR environment. For instance, engaging with advertisements in a VR world interface to cause real-world purchases and actions regarding, e.g., content consumption and/or service providers, is currently a cumbersome, inconsistent, and non-personalized experience.

In one approach, a user is provided with limited, non-personalized options to engage with the content to effect change within the VR environment itself. For example, in such an approach, the user may be provided with generic options to hide an advertisement in the VR world or view more details of the advertisement in the VR world. In such approach, if a user wishes to buy the product advertised in the VR world, watch a movie advertised in the VR world, or make a payment to subscribe to a service advertised in the VR world, the user needs to leave the VR environment and use an external device to do so. For example, if an advertisement about an upcoming NFL game or a new show on Hulu is displayed in a VR environment, the user may wish to book a ticket for the NFL game or subscribe to the Hulu, but would have to take multiple steps to do so. For example, the user may need to pause his or her VR session, exit the VR environment, remember the product or service he or she is interested in, navigate to an application or website associated with the product or service, and purchase or subscribe to such product or service. This may be tedious and frustrating to the user, and he or she may not bother to interrupt a VR session in order to perform such multiple steps outside the VR environment, and may forget to do so after the VR session, which is a missed opportunity for service providers. It would be desirable for a user to be provided with personalized options to interact with the content in the VR environment such that the user's interactions in the VR environment can seamlessly cause an action (e.g., configuration of a service or purchase of a product associated with the interactive content) to be performed in association with a service provided by a service provider, where such service is external to the VR environment.

To overcome these problems, systems, apparatuses, and methods are provided herein for generating a VR environment comprising an interactive object, wherein the interactive object is associated with a service provider and is generated based on a user profile associated with a current VR session in the VR environment. User input may be detected in association with one or more options associated with the interactive object. Based on the detecting, the provided systems and method may cause an action to be performed in association with the user profile and the service provider associated with the interactive object, wherein the action comprises accessing a service provided by the service provider, the service being external to the VR environment Such aspects enable an improved user experience in a VR session, e.g., by providing options to enable actions to be taken outside the VR environment, thereby allowing a user to seamlessly participate in a VR session and instruct, with minimal effort, performance of an action in connection with products or services shown in the VR environment (e.g., purchase of the product or provision of the service) without having to leave the VR environment. Moreover, engagement options may be selectively presented to users in the VR environment in a personalized manner, to prevent disturbance of the user's VR experience due to overwhelming the user with content in which he or she is unlikely to be interested, and provide content and personalized engagement options that the user is likely to be interested in engaging. Such features may also be beneficial to third parties (e.g., advertisers), in that such third parties may be provided with the opportunity to upsell products or services to existing subscribers (e.g., by providing an additional venue to access and/or control their services) or users as well as to new subscribers or users, based on likely user interest. For example, users may receive different engagement options depending on their subscription status to a service provider associated with an interactive object in the VR environment. In some embodiments, a universal or master account may be employed, to enable a user profile with the VR environment to be linked to subscriptions or accounts with service providers, facilitating the performance of actions in connection with services of such service providers. In some embodiments, the system may be implemented in a client app-based manner to remove the burden of hyper-personalization from the content presenter (e.g., a streaming provider or VR provider or advertiser) which may be controlling display of content in the VR environment.

In some aspects of this disclosure, the provided systems and methods may be further configured to determine whether the user profile is subscribed to the service provider, and in response to determining that the user profile is subscribed to the service provider, generate the interactive object by generating for display one or more options associated with the interactive object and available to a subscriber of the service provider.

In some embodiments, the provided systems and methods may be further configured to, in response to determining that the user profile is not subscribed to the service provider, generate the interactive object by generating for display one or more options associated with the interactive object and available to a non-subscriber of the service provider. The one or more options available to the subscriber of the service provider may be different from the one or more options available to the non-subscriber of the service provider.

In some aspects of this disclosure, determining that the user profile is subscribed to the service provider comprises identifying an indication in the user profile that a user associated with the user profile is subscribed to the service provider.

In some embodiments, the service provider is a media asset provider, and the one or more options associated with the interactive object and available to the subscriber of the service provider comprise at least one of an option to consume a media asset associated with the interactive object, an option to consume a preview of the media asset, an option to record the media asset, or an option to associate the media asset with the user profile.

In some aspects of this disclosure, the service provider is a media asset provider, and the one or more options associated with the interactive object and available to the non-subscriber of the service provider comprise at least one of an option to subscribe to the service provider, a first free trial option to consume the media asset with one or more advertisements, or a second free trial option to consume the media asset without the one or more advertisements.

In some embodiments, the VR environment is generated for display at a first device, and the one or more options associated with the interactive object are generated for display at a second device different from the first device.

In some aspects of this disclosure, generating the one or more options associated with the interactive object is performed in response to determining that an avatar associated with the user profile in the VR environment is proximate to the interactive object and/or in response to determining that a gaze is directed at the interactive object.

In some embodiments, detecting the user input comprises receiving voice input and determining the voice input relates to the interactive object.

In some aspects of this disclosure, the VR environment includes an avatar associated with the user profile and the VR session of the VR environment includes a plurality of other avatars associated with other user profiles. The voice input may not be shared with the other avatars in response to determining the voice input relates to the interactive object.

BRIEF DESCRIPTION OF THE DRAWINGS

The present disclosure, in accordance with one or more various embodiments, is described in detail with reference to the following figures. The drawings are provided for purposes of illustration only and merely depict typical or example embodiments. These drawings are provided to facilitate an understanding of the concepts disclosed herein and should not be considered limiting of the breadth, scope, or applicability of these concepts. It should be noted that for clarity and ease of illustration, these drawings are not necessarily made to scale.

DETAILED DESCRIPTION

Figure 1:
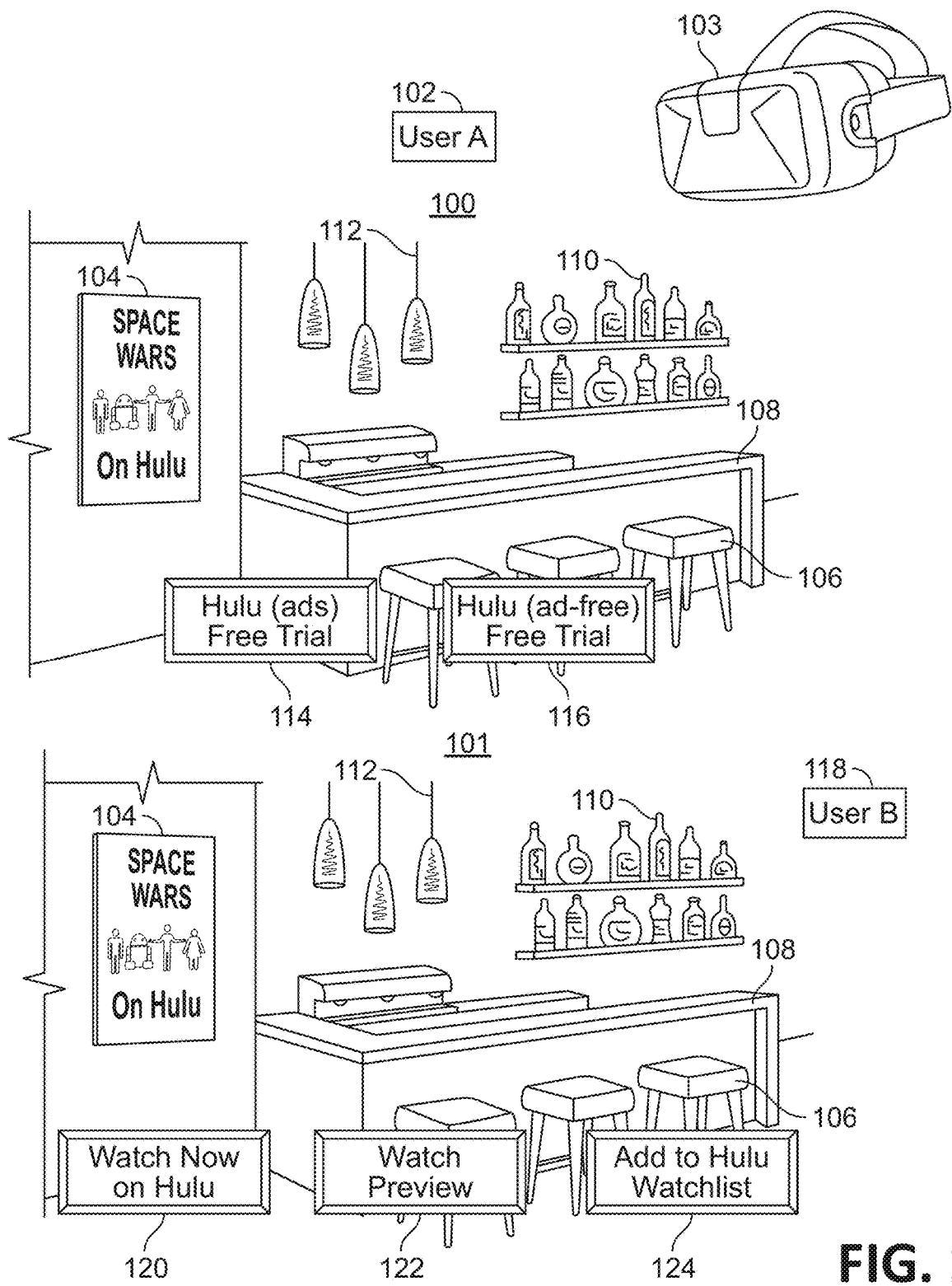
FIG. 1 shows an illustrative system for providing personalized engagement options in a VR environment, in accordance with some embodiments of this disclosure.

FIG. 1 shows an illustrative system for providing personalized engagement options in a VR environment, in accordance with some embodiments of this disclosure. A top portion of FIG. 1 shows VR environment 100 generated in a personalized manner to User A specified at 102, and a bottom portion of FIG. 1 shows VR environment 101 generated in a personalized manner to User B specified at 118. The VR environments may fully immerse (e.g., giving the user a sense of being in an environment) or partially immerse (e.g., giving the user the sense of looking at an environment) users in a 3D, computer-generated environment that simulates a realistic set of conditions. In some embodiments, VR environments 100 and 101 may be provided by way of a VR application (e.g., executing at least in part at VR device 103 and/or one or more remote servers or other computing devices), and the VR application may be configured to perform the functionalities described herein. In some embodiments, the VR application may be provided as part of an operating system or other computing platform of VR device 103, may be installed at or otherwise provided to VR device 103, may be provided via an application programming interface (API), or may be provided as an add-on application to another VR application, or may be provided using any suitable technique, or any combination thereof. In some embodiments, software tools (e.g., one or more software development kits, or SDKs) may be provided to any suitable party, to enable the party to implement the functionalities as discussed herein.

VR device 103 may be, for example, a VR head-mounted display (HMD) with one or more displays configured to provide 3D imagery to a user's eyes. In some embodiments, VR device 103 may additionally or alternatively correspond to VR glasses, VR goggles, a stereoscopic display, a mobile device such as a smartphone or tablet, a laptop, a desktop computer, a smart watch or wearable device, smart glasses, a smart television, or any other suitable computing device, or any combination thereof. In some embodiments, VR device 103 may include or be used in conjunction with any other suitable sensors or equipment, e.g., VR haptic gloves, to provide a realistic touch sensation, a VR remote controller, a VR baseball bat or golf club or other suitable VR item, a VR body tracker, and/or any other suitable sensor or equipment.

In the example of FIG. 1, environments 100 and 101 correspond to a virtual bar, but it should be appreciated that environments 100 and 101 may correspond to a representation of any suitable environment. For example, VR environment 100 may correspond to a digital representation or digital twin of a real physical environment surrounding User A, or may correspond to a digital representation of any suitable real location or place remote from user 102 or may correspond to a digital representation of a fictional environment (e.g., from a video game, book, movie, TV show or any other suitable fictional environment). In some embodiments, an other user(s) or entity(ies) may be participating in a VR session with User A, and a digital representation (e.g., an avatar) of such other user(s) within environment 100 may be displayed, and/or a digital representation (e.g., avatar) of User A may be displayed. For example, the avatars may show a location of the user within the VR environment and facilitate and depict user interactions with the VR environment. In some embodiments, generating for display VR environment 100 may correspond to generating for display a video or other imagery corresponding to VR environment 101 and/or or any other suitable content.

As shown in FIG. 1, VR environments 100 and 101 may comprise one or more objects, such as, for example, supplemental content (e.g., an advertisement) 104 for a service (e.g., provision of a media asset titled "Space Wars" or any other suitable service) available via a particular service provider (e.g., Hulu or any other suitable service provider). Object 104 may be associated with any suitable product or service provider (e.g., an internet service provider (ISP), a media asset provider, or any other suitable service provider or product provider) capable of providing any suitable service (e.g., provision of an offer to subscribe to a particular service or upgrade or otherwise interact with an existing service). As referred to herein, the term "media asset" should be understood to refer to an electronically consumable user asset, e.g., television programming, as well as pay-per-view programs, on-demand programs (as in video-on-demand (VOD) systems), internet content (e.g., streaming content, downloadable content, webcasts, etc.), augmented reality content, VR content, video clips, audio, playlists, websites, articles, electronic books, blogs, social media, applications, games, and/or any other media or multimedia, and/or combination of the above.

In addition to object 104, VR environments 100 and 101 may comprise other virtual objects, such as, for example, a barstool 106, bar 108, bottles 110 and lights 112. In some embodiments, one or more of objects 104, 106, 108, 110 and 112 may be interactive such that User A may be permitted to interact with the object to cause additional information or options associated with the object to appear or to alter or modify an appearance or state of the object. For example, the VR application may permit User A to interact with objects within a gaze of User A or within a field of view (FOV) of User A within VR environment 100; based on receiving voice commands, touch input, biometric input, hand gestures or other selection input in association with an object within VR environment 100; based on User A being proximate to an avatar of User A in VR environment 100; or based on any other suitable criteria or trigger or any combination thereof. As an example, the VR application may enable user 102 to turn off light 112 or turn on light 112 in VR environment 100, sit down at barstool 106 with his or her avatar, obtain a drink from bar 108 with his or her avatar, or any other suitable interaction may be enabled, or any combination thereof.

An FOV may be understood as a portion of an environment (real or virtual or any suitable combination thereof) that is captured by a camera of a user device at a given time, and/or presented to the user at a given time by the user device (e.g., an angle in a 360-degree sphere environment, or any suitable number of degrees). In some embodiments, the FOV may comprise a pair of two-dimensional (2D) images to create a stereoscopic view in the case of a VR device; in the case of an AR device (e.g., smart glasses), the FOV may comprise 3D or 2D images, which may include a mix of real objects and virtual objects overlaid on top of the real objects using the AR device (e.g., for smart glasses, a picture captured with a camera and content added by the smart glasses). If a VR environment has a single degree of freedom, e.g., a rotation of 360 degrees, any FOV may be defined by either the edge angular coordinates (e.g., +135 degrees, +225 degrees) or by a single angular coordinate (e.g., −55 degrees) combined with the known angular opening of the FOV. If a VR environment has six degrees of freedom, such as, for example, three rotations of 360 degrees and three spatial positions, any FOV may be defined by three angular coordinates and three spatial coordinates. An FOV may therefore be understood as a portion of an environment displayed when the user is at a particular location in the environment and has oriented the display device in a particular direction.

In some embodiments, one or more options 114 and 116 may be generated for display in VR environment 100 in association with interactive object 104, e.g., based on determining that User A is likely to be interested in interactive object 104 or based on any other suitable user data of User A, and/or based on receiving input from User A and/or based on actions of User A within VR environment 100. In some embodiments, the VR application may generate the one or more interactive options 114 and 116 in VR environment 100 to facilitate personalized engagement with User A based on user data associated with a user profile or user account of User A. For example, options 114 (e.g., a Hulu free trial with ads) and 116 (e.g., a Hulu free trial without ads) may be generated at least in part based on determining, from the user data, that User A is not a subscriber of the service provider (e.g., Hulu) associated with interactive object 104. That is, free trial options associated with options 114 and 116 may be suitable for a non-subscriber of a service provider not currently having access to content on the service provider. On the other hand, options 120, 122 and 124 may be provided in VR environment 101 to User B in association with interactive object 104, based on determining that User B is already a subscriber of the service provider (e.g., Hulu) associated with interactive object 104. For example, options 120 ("Watch Now on Hulu"), 122 ("Watch Preview") and 124 ("Add to Hulu Watchlist") may be determined to be suitable for a current subscriber of the service provider having access to content on the service provider. In some embodiments, interactive objects and/or options provided to a user may, additionally or alternatively, be based on any other suitable factor, e.g., a location or demographic of the user, past interactions in VR environments or other environments by the user, or any other suitable factor, or any combination thereof. For example, the service provider may only be available in certain countries or regions (e.g., the U.S.) and thus options 114 and 116, or options 120, 122 and 122, may be provided based on User A or User B being determined to be located in the U.S. (e.g., based on an IP address, device ID, profile information, GPS information or based on any other suitable information or any combination thereof). In some embodiments, a period of time of the free trial associated with option 114 may exceed a period of time of the free trial associated with option 114, to incentivize a user to choose the free trial including advertisements.

The VR application may detect user input in association with the one or more options associated with interactive object 104. For example, the VR application may receive selection of option 114 or option 116 via a user gesture, e.g., touch input, detecting the user motioning towards the option, voice input, user gaze, biometric input or any other suitable input or any combination thereof. Based on detecting such input, the VR application may cause an action to be performed in association with the user profile of User A and the service provider associated with the interactive object. In some embodiments, such action may comprise accessing a service (e.g., the Hulu streaming service) associated with the service provider (e.g., Hulu) and such service may be external to VR environment 100. In some embodiments, such action may be performed or caused to be performed based on the input received in association with VR environment 100 without the need for User A to disconnect or disengage from VR environment 101. For example, the VR application may cause a free trial of "Space Wars," associated with Hulu streaming session and option 114 or 116, to be launched at one or more devices other than VR device 103 (or be played at VR device 103 instead of VR environment 100). In some embodiments, the action that the VR application causes to be performed may correspond to updating a service user profile or master profile or VR application user profile associated with User A, e.g., with an indication of an interest in "Space Wars" associated with object 104, or to schedule a viewing of the free trial of "Space Wars" at a later time.

As another example, the VR application may receive selection of option 120, 122 or option 124 via a user gesture, e.g., touch input, pointing towards or motioning towards an object, voice input referencing the object, user gaze at the object for a threshold period of time, biometric input in association with the object or any other suitable input or any combination thereof. Based on detecting such input, the VR application may cause an action to be performed in association with the user profile of User B and the service provider associated with the interactive object. In some embodiments, such action may comprise accessing a service (e.g., the Hulu streaming service) associated with the service provider (e.g., Hulu) and such service may be external to VR environment 101. In some embodiments, such action may be performed or caused to be performed based on the input received in association with VR environment 101 without the need for User B to disconnect or disengage from VR environment 101. For example, the VR application may cause the media asset "Space Wars," associated with Hulu streaming session and option 120, or a preview thereof (associated with option 122) to be launched at one or more devices other than VR device 103 (or be played at VR device 103 instead of VR environment 101). In some embodiments, playing the media asset at VR device 103 may be performed by invoking an application installed on VR device 103 (e.g., the Hulu application). In some embodiments, the action that the VR application causes to be performed may correspond to updating a service user profile or master profile or VR application user profile associated with User B, e.g., with an indication of an interest in "Space Wars" associated with object 104, or to schedule a recording of "Space Wars" or add "Space Wars" to a Hulu watchlist (associated with User B).

In some embodiments, one or more of the options associated with interactive object 104 may be associated with purchasing a ticket to view a media asset (e.g., "Space Wars") associated with the interactive object. For example, upon detecting input associated with such an option, the VR application may cause the user to be redirected to an application or website (e.g., within the VR environment or on an external device, such as device 202 of FIG. 2, proximate to VR device 103) at which the user may purchase the movie ticket, or, an application or website at which the user may view and purchase or otherwise interact with other products or services associated with interactive object 104. In some embodiments, an email or mobile device of the user may receive a URL or other notification corresponding to the ticket purchase website or application. In some embodiments, the service associated with an interactive object in the VR environment may correspond to initiating the provision of a new service (e.g., an ISP targeting User A or User B in a VR environment with a plan that offers faster internet speeds), based on, for example, the user's profile indicating he or she uses the internet for gaming frequently or frequently performs other bandwidth-intensive activities, and thus may be interested in such an upgrade. As another example, the service associated with the interactive object with which user input or interaction is detected may be a service provision a new channel or package (e.g., HBO advertising an exclusive show where the user is already subscribed or is not already subscribed to HBO). In some embodiments, the VR application may cause one or more actions to be performed external to the VR environment, without the need for the user to disconnect from the VR session.

In some embodiments, VR environment 100 or 101 may correspond to a digital representation of, for example, a casino (e.g., a digital replica of an actual casino in Las Vegas). In such example, the objects and/or options in VR environment 100 or 101 may be related to enabling a user to place a wager on a sports game or casino game, and/or enable a user to make a payment (e.g., with a mobile wallet or financial services account) to activate a game (e.g., a lot machine) within the VR environment, or redeem a coupon in a digital wallet, or provide any other suitable option.

Figure 2:
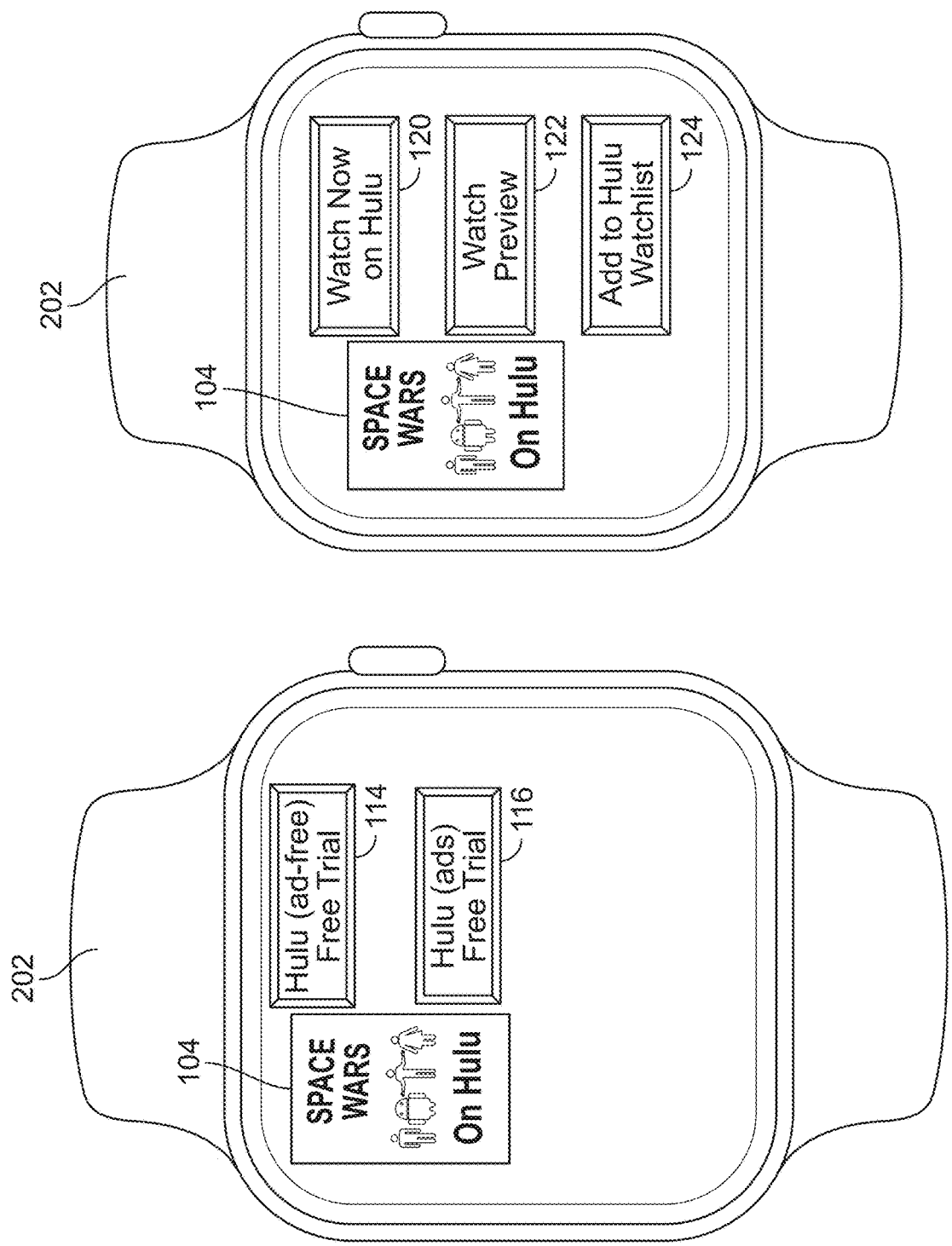
FIG. 2 shows an illustrative display, in accordance with some embodiments of this disclosure.

FIG. 2 shows an illustrative display, in accordance with some embodiments of this disclosure. As shown in FIG. 2, one or more of the options 114 and 116 of FIG. 1, or one or more of the options 120, 122 and 124 of FIG. 1, may be transmitted for display to a second device 202 that is different from VR device 103 of FIG. 1. In some embodiments, none of the interactive objects generated for environment 100 or 101 may be transmitted for display to device 202. Alternatively, some or all of the interactive objects generated for environment 100 or 101 may be transmitted for display to device 202. In some embodiments, device 202 may be a mobile device, a VR device, smart watch, or any other suitable device, or any combination thereof. Device 202 may be caused to display interactive object 104 or another identifier of a media asset (e.g., "Space Wars") or other service or product related to options 114 and 116, or associated with options 120, 122 or 124. In some embodiments, options 114 and 116 of FIG. 1, or options 120, 122 or 124 of FIG. 1, or any other suitable portions of VR environment 100 or 101, may be shown on device 202 but not on VR device 103, or may be shown on each of device 202 and VR device 103, or may be shown only on VR device 103. In some embodiments, device 202 may be in communication with VR device 103 over a Wi-Fi network, over the internet and/or via a short-range wireless communication protocol.

Figure 3:
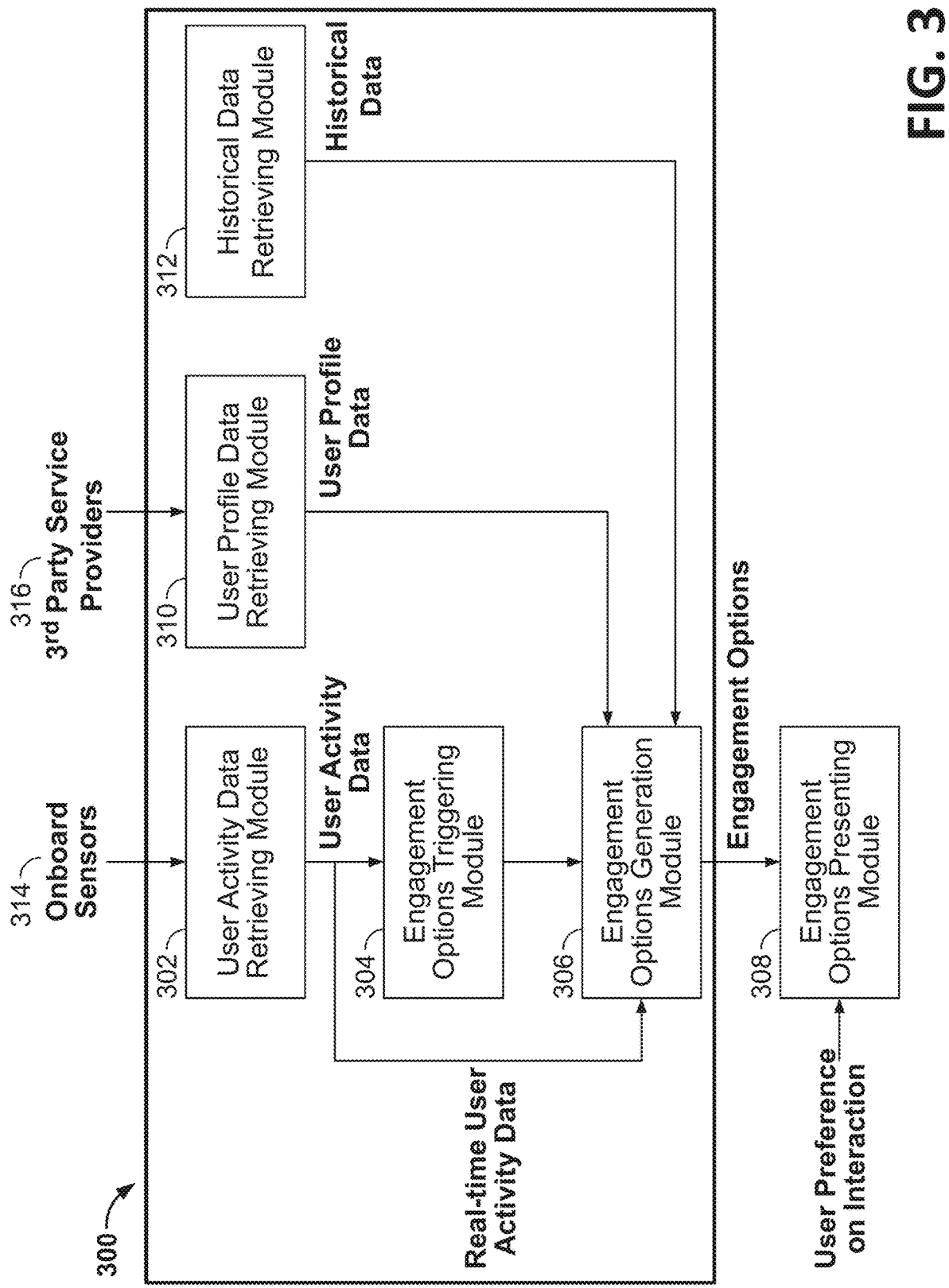
FIG. 3 shows a block diagram of an illustrative system for providing personalized engagement options in a VR environment, in accordance with some embodiments of this disclosure.

FIG. 3 shows a block diagram of an illustrative system 300 for providing personalized engagement options in a VR environment, in accordance with some embodiments of this disclosure. In some embodiments, the VR application may be executable to implement system 300. In some embodiments, system 300 may be implemented at least in part as a client application that execution at least in part on VR device 103 of FIG. 1 and generates personalized engagement options to enable seamless service provision, activation, configuration and/or purchase of a product or service related to content being interreacted with or otherwise presented in a VR environment. In some embodiments, system 300 may be implemented as an independent service or can be integrated with the VR environment, or can be part of a content presenter's system (e.g., a VR provider, a streaming provider and/or an advertiser).

System 300 may comprise user activity data retrieving module 302, engagement options triggering module 304, engagement options generating module 306, engagement options presenting module 308, user profile data retrieving module 310, and historical data retrieving module 312. Engagement options generating module 306 may be configured to generate one or more engagement options (e.g., options 120, 122 and/or 124 of FIG. 1) based on one or more of real-time user activity data or historical user activity data received from user activity data retrieving module 302, user profile data received from user profile data retrieving module 310 and historical data (e.g., of a particular user or similarly situated users) received from historical data retrieving module 312 and/or any other suitable data. Engagement options generating module 306 may send the generated engagement options to an engagement options presentation module 308, which may be implemented by the VR application and/or a third-party service provider 316 (e.g., associated with an advertising company server). In some embodiments, engagement options triggering module 304 may be configured to determine whether detected user inputs or other user actions meet certain criteria (e.g., whether the user is likely to be interested in an object or option and/or has interacted with or gazed at the object or option for a sufficient period of time) associated with presenting personalized engagement options in a VR environment.

In some embodiments, the user profile of a user associated with the VR application and/or VR device 103 of FIG. 1 may store historical user interactions within VR environments, friends of the user, interests of the user and an avatar or other representation of the user seen by other users in the VR environment. In some embodiments, the user profile of a user associated with the VR application and/or VR device 103 of FIG. 1 may correspond to, or otherwise be linked to, a master or universal account for a particular user. For example, such master account may be usable in the real world to access a variety of products, services and/or product or service providers, and the master account may be usable as a pass-through account such that actions taken in association with the VR application and/or VR environment may be applied to any suitable number of subscriptions or accounts (linked to the master account) in connection with environments external to the VR environment. In some embodiments, the master account or user profile may correspond to an account or profile in a closed ecosystem (e.g., Apple products or services, or products or services associated with another particular entity). For example, a user profile or account may be configured to be used on a mobile device, television and VR device, and the subscriptions of the user, as well as applications downloaded and/or used by the user, may be known and can be accessed across various devices associated with the user profile or account.

In some embodiments, the master account and/or VR user profile may receive input from a user requesting to link sub-accounts to the master account, e.g., a user may be provided with an option to indicate to the master account that he or she has a Hulu subscription and may enter his or her Hulu credentials to link the Hulu account to the master account and/or VR user profile. In some embodiments, such features may allow a user to control an external service (e.g., an over-the-top (OTT) media service or an ISP or any other suitable service) from within the VR environment such as, for example, if the user is a subscriber to the OTT media service. For example, the avatar of the user may be provided with the ability to upgrade or provision extra services from within the VR environment, based on offers or advertisements targeted to the user. In some embodiments, accounts or subscriptions may be linked to the master account and/or VR user profile automatically or substantially automatically, e.g., with minimal or no input required from the user to link such accounts. For example, an operating system of VR device 103 or another device may correlate accounts of the user to the master account and/or VR user profile based on matching email addresses, device identifiers, IP addresses, app store profiles, or based on any other suitable criteria, or any combination thereof. In some embodiments, once accounts for service providers are linked to the master account or VR user profile, the VR application may permit actions to be performed within the VR environment in association with such service providers, e.g., to execute one or more functions outside the VR world. In some embodiments, the VR application may permit users to cause actions to be performed within the VR environment based on his or her subscription(s), e.g., a user immersed in the VR environment may utilize his or her Hulu account to enable a media asset available on Hulu to be consumed within the VR environment, e.g., on a virtual object representing a television.

Figure 4:
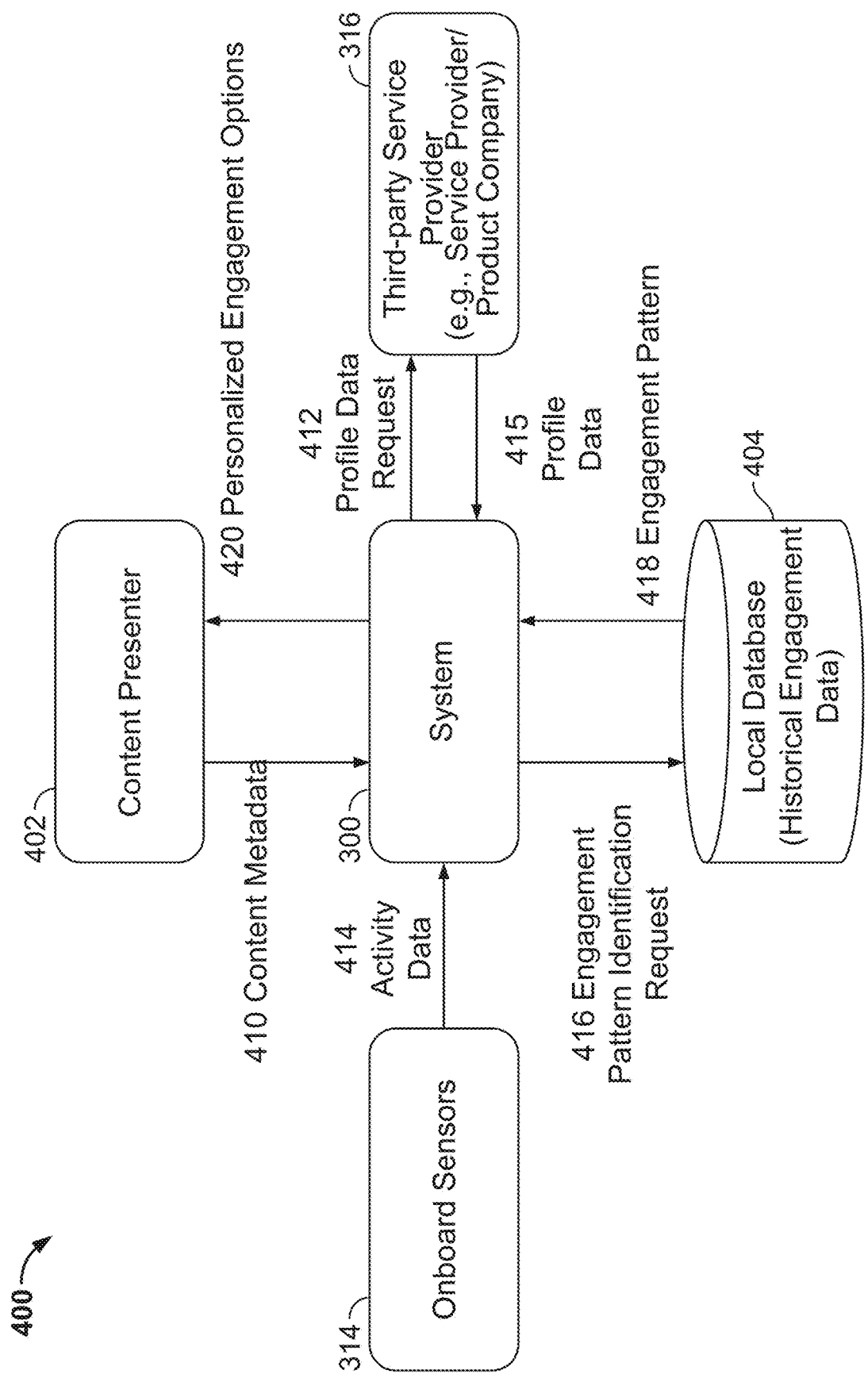
FIG. 4 shows an illustrative sequence of operations, in accordance with some embodiments of this disclosure.

FIG. 4 shows an illustrative sequence of operations 400, in accordance with some embodiments of this disclosure. In some embodiments, system 300 may include or otherwise be in communication with sensors 314, third-party service provider 316, content presenter 402 and database 404. In some embodiments, prior to generating any engagement options, system 300 may perform a threshold determination as to whether a user is interested in a particular object (e.g., interactive object 104 of FIG. 1). If it is determined that the user is likely interested in the content (e.g., based on the user's historical activity or current activity), the system may generate personalized engagement options for the content. For example, if the user selects, via any suitable input, interactive object 104, the VR application may determine that the user is interested in such object. As another example, the user's interest in an object may be determined based on the user's avatar's proximity to such object in the VR environment for a threshold period of time, and/or the object being in an FOV and/or gaze of the user for at least a threshold period of time.

In some embodiments, a user's interest in an interactive object and/or option can be determined based on a directional orientation of the user's avatar with respect to the displayed interactive object or option. Visual proximity of the avatar can be determined based on comparing 3D coordinates (e.g., of pixels or voxels) of the avatar to the object or portion in the virtual space, and/or an angle of user movement with respect to the displayed content, and/or using any other suitable technique. In some embodiments, the VR application may detect when and where the user enters the VR environment, set a default FOV, detect the number of objects in the environment and/or in the gaze or FOV, and compute respective virtual distances, or focal lengths, of the each of the detected objects with respect to a user's avatar. The objects may be at different virtual distances from the user. In some embodiments, identifying an object in the FOV or gaze of the user comprises determining the object is at a closest virtual distance to the user of the respective virtual distances or focal lengths. The virtual distance may be, for example, the perceived distance the object in the VR environment is from the user's avatar, and may be calculated based on coordinates of the object in the VR environment.

In some embodiments, if the avatar has been in visual proximity of the content for more than a threshold time, system 300 may determine that the user associated with the avatar is interested in the content. In some embodiments, user interest may be determined at least in part based on whether a hidden code or QR code embedded with the content is scanned by the user through eye gaze or using a digital twin mobile device within the VR environment having a code scanning feature (e.g., a QR code reader). In some embodiments, when a user watches certain content (e.g., associated with interactive object 104) for more than a threshold period, a URL or other mechanism can automatically be triggered to register user interest in the content. Once the interest in the content is determined, system 300 may generate one or more personalized engagement options.

In some embodiments, system 300 may be implemented as an independent service or integrated with a content presenter 402 (e.g., an advertisement service or streaming provider or any other suitable service provider) or other third-party service provider 316 (e.g., an advertisement service or streaming provider or any other suitable service provider). In some embodiments, system 300 may operate as an independent service that can personalize engagement options based on the user data and content metadata. In some embodiments, system 300 may maintain a correlation between an avatar identifier and a user profile identifier within the VR environment. For example, system 300 may collect content metadata and avatar activity data from the VR environment in association with the avatar identifier, and collect user profile information in association with the user identifier. In some embodiments, historical engagement options selection data can be collected from the VR environment in association with the avatar identifier and from the external devices in association with the user profile identifier. Based on the user data, the service may generate personalized engagement options and present them within the VR environment and/or on an external device. In some embodiments, depending on user data and access permissions to the VR environment, system 300 may be integrated with content presenter 402 and/or third-party service provider 316.

As shown in FIG. 4, system 300 may receive ContentMetadata from content presenter 402, e.g., corresponding to or implemented at VR device 103 in association with the VR application. In some embodiments, the ContentMetadata may comprise information associated with the following fields: ContentID; ContentType: (e.g. service, product, mediacontent); Product company ID/service provider ID/content provider ID; Enumerated engagement options (EP1, EP2, EP3, . . . EPn); Content relevance expiry time; ProductID; ServiceID; ContentID; Coupon; URL, or any other suitable information, or any combination thereof.

In some embodiments, based on receiving such metadata, system 300 may retrieve and/or access user profile data (e.g., a user profile associated with the VR application and/or the master account) at 412 and 415, user activity data at 414, and historical engagement patterns, at 416 and 418, for different types of content. In some embodiments, such retrieved and/or accessed data may be used for personalizing and presenting engagement options at 420 within the VR environment (e.g., at VR device 103) and/or on an external device. In some embodiments, system 300 may be configured to select optimal engagement options out of a number of candidate engagement options, based on the retrieved and/or accessed data. In some embodiments, system 300 may take into consideration relevance expiry time to generate and/or present the engagement options. For example, system 300 may display the engagement options only until the expiry time elapses, or if the expiry time is zero, system 300 may not generate personalized engagement options for content associated with such expiry time.

In some embodiments, system 300 may monitor and collect user profile data in association with objects and other features of the VR environment. For example, the user may explicitly input his or her interests in association with the user profile, and/or the user's interests may be inferred based on his or her interactions, activities and habits in the VR environment and across any suitable number of applications or websites, e.g., linked to the user's master account. In some embodiments, the user profile data indicates if the user is subscribed to a service associated with an object (e.g., interactive object 104 of FIG. 1) or owns a product associated with the object. For example, if the object is associated with a new HBO show, the user profile data may indicate if the user is already an HBO subscriber, which HBO package the user is subscribed to, and/or if the package that the user subscribed to includes the content associated with the interactive object, and engagement options may be provided based on such data. If the user is not found to be an existing subscriber, the system may provide a first set of engagement options (e.g., the option to buy a new subscription and/or any other suitable option) for display. If the user is found to be an existing subscriber, the system may provide a different set of options, e.g., based on whether the user is a subscriber of a package having the particular show. If the content associated with the interactive object is not part of the user subscribed package, the system may provide a second set of engagement options (e.g., the option to buy a new package or advance service or unlock advanced features). If the displayed content is part of the user package, the system may provide a third set of engagement options (e.g. include the show in the watch list, record the show on a set-top box, or any other suitable options, or any combination thereof).

In some embodiments, system 300 may consider the user's physical world location (and/or location within the VR environment) and/or other demographic information while generating engagement options. For example, it may be the case that certain content is unavailable for purchase or subscription in certain regions, and thus certain engagement options associated with such content may not be generated, or may be grayed out, based on the user's real or virtual location. In some embodiments, for displayed content (e.g., a football game) in a VR environment, system 300 may generate an option to subscribe to a TV channel/or streaming service that may provide the displayed content (e.g., the football game) at the physical location of the user.

In some embodiments, system 300 may be configured to generate personalized engagement options based on avatar activity data including sensor data, predicted movement of the avatar in the VR environment, next scene information, and/or any other suitable data. For example, system 300 may generate personalized engagement options based on avatar activity data comprising past, present, and predicted activities of the avatar within the VR environment. In some embodiments, system 300 may consider current scene information and next scene information (and/or past scene information) to determine how a user's avatar may be likely to move within the VR environment (e.g., VR environment 100 of FIG. 1). System 300 may collect avatar activity data from sensors 314 on board or otherwise associated with or proximate to the VR device (e.g., VR device 103 of FIG. 1). In some embodiments, avatar activity data may include data collected from the on-board sensors such as, for example, eye-movement scanners, outward-facing cameras, inertial measurement units (e.g., accelerometers, gyroscopes, magnetometers, or any other suitable sensors, or any combination thereof), or head trackers, or any other suitable sensors or any combination thereof. In some embodiments, system 300 may use user activity data to predict an engagement time that the avatar can spend, or is likely to spend, to engage with content. For example, based at least in part on such predicted instant engagement time, system 300 may select engagement options. If the instant engagement time is above a threshold value, the system may present engagement options that require relatively more time to consume and interact with; if the instant engagement time is less than a threshold value, system 300 may select engagement options that require relatively less time to consume and interact with. For example, if the user is, within the VR environment, determined to be engaged in an intense fight scene, such user may not have much time to engage with engagement options, e.g., requiring more than one half of a second, and thus system 300 may only present engagement options (if any) determined to require less than one half of a second. On the other hand, if the user is determined to be passively roaming around the VR environment, engagement options, e.g., "watch the trailer" that may be determined to require 10 seconds or more may be presented.

In some embodiments, system 300 may generate a personalized engagement option associated with an object (e.g., interactive object 104 of FIG. 1) based on the user's historical engagement with similar objects and/or advertisements. For example, content metadata of a currently displayed object can be compared with metadata of past content the user interreacted with to determine whether the content is content of a similar nature. For example, if a user previously interacted with an engagement option associated with a particular media asset at a prior time in the VR environment or in another circumstance, the VR application may generate for presentation one or more engagement options associated with the same media asset or associated with a media asset having similar characteristics to the previously interacted—with media asset. As another example, if the user previously selected an "add to watch list" option in association with a particular media asset, the system may present the same option for a new media asset having similar characteristics. In some embodiments, system 300 may share user data and interests in the interactive object, and/or options associated therewith, with third-party service provider(s) 316 (e.g., Comcast or any other suitable service providers or types of service providers), and such service provider(s) can pitch in its offerings and allow the service provider/product company/advertiser to upsell additional services.

In some embodiments, even in absence of the user profile data, user activity data, and/or historical engagement patterns, system 300 may be configured to generate a set of engagement options based on content metadata, e.g., based on a type of content. For example, if the content is for or associated with a movie or television program, the client app may present a set of engagement options normally used to schedule or control consumption of the media content. As an example, engagement options for a television show may correspond to an option to subscribe to the show; subscribe to a particular package from among a plurality of packages; add the show to a watchlist; share the show with one or more friends; play a trailer or preview of the show; show cast information for the show; rent the show; show parental ratings for the show; provision a content provider (e.g., Comcast) to add a channel (e.g., HBO) having the show to a user's subscription; or any other suitable engagement option; or any combination thereof. In some embodiments, at least a portion of the engagement options may be dummy options (e.g., presented within the VR environment and/or on an external device), which may not have an active link from the content presenter. In some embodiments, when a user selects an engagement option from the set of engagement options, the client app may send the content and the selected engagement option to the content owner (or advertiser), which may determine the intent of the user and take a suitable action based on the determined intent.

In some embodiments, system 300 may use user activity data, and/or historical engagement patterns, to determine whether to present the one or more engagement options by way of a voice prompt and/or a graphical user interface (GUI) or other interface of VR device 103 or second device 202. For example, if system 300 determines that the user is unlikely to pay visual attention to the engagement options (e.g., based on determining that the user's avatar is preoccupied in the VR environment, that the user's avatar is moving fast in the VR environment, or any other suitable reason), system 300 may determine to provide the one or more engagement options via a voice interface (e.g., at VR device 103 and/or user device 202). In such an instance, system 300 may or may not provide displayed indications of the engagement options 114 and 116 (or options 120, 122 and 124 of FIG. 1), e.g., if the displayed indications may disturb an otherwise preoccupied user. The VR application may determine that the user has interacted with or selected an engagement option using a voice command (e.g., "Add 'Space Wars' to my Hulu watchlist"). In some embodiments, system 300 may allow a user to use a combination of voice interface (e.g., voice shortcuts) and GUI (e.g., buttons or icons or other interactive tools) to select the personalized engagement options, or may only present the options without providing a voice interface.

In some embodiments, if system 300 determines to provide the engagement options on external device 202, the VR device 103 may broadcast the advertiser ID through a network (e.g., Wi-Fi) or a short-range communication protocol (e.g., NFC or Bluetooth). If there is any device that has service or product purchase support associated with the advertiser ID, system 300 may push the engagement options to the external device. In some embodiments, system 300 may provide engagement options to second device 202 if VR device 103 and second device 202 are already paired. In some embodiments, system 300 may enable the user to select one or more of the engagement options on second device 202 using the passthrough feature of VR device 103 or VR application, or after completing the VR session at the VR device using the VR application.

In some embodiments, based on any suitable combination of user profile data, activity data including sensor data, predicted movement of the avatar in the VR environment, and next scene information, and historical data related to the avatar's engagement with similar content in the past, system 300 may generate and provide the most suitable engagement options to the avatar. In some embodiments, system 300 may provide personalized engagement options around the place where the content (e.g., interactive object 104) was initially presented. In some embodiments, one or more of the engagement options may be displayed in a manner that is oriented with the viewing direction of the user in the VR environment, and can be displayed within the viewing angle of the user, even if the user is no longer paying attention to the content.

In some embodiments, system 300 may cause one or more interactive objects or engagement options to be placed within a viewing window, if the user has moved his or her eyes from the original content. In some embodiments, the engagement options can be closed or declined using coordination of eye gaze and voice input.

In some embodiments, the engagement options can be presented on an external device that is connected to the user or is in proximity to the VR device. The avatar may choose how and when he or she wants to engage with the content within the VR environment or outside the VR environment. In some embodiments, system 300 may send the selected engagement options only to the external device. For example, an engagement option may be presented to the user's smartwatch or smartphone to further engagement. Based on the pushed notification sent to the external device, system 300 may send a signal to activate pass-through to show the options at the external device and allow the user to continue the engagement on an external device.

In some embodiments, a plurality of other users, associated with a plurality of respective avatars, may be present in the VR environment. In such an instance, if a voice interface is selected for outputting the engagement options and/or receiving input of an engagement option, system 300 may selectively use the voice input for enabling user engagement. For example, system 300 may, upon determining that voice input relates to an engagement option, decline to share the voice input with the other users participating in the VR environment, and instead apply the received input to cause an action associated with the engagement option to be performed in connection with a service provider external to the VR environment. Such features may be implemented by system 300 automatically, or based on receiving input from the user indicating a desire not to share voice input or voice prompts related to the engagement options with other users. In some embodiments, system 300 may employ natural language processing (NLP) techniques to determine if the user voice input relates to any of the engagement options, and if so, may disambiguate the voice input to interpret the voice input and select an engagement option based on such input, instead of relaying the voice input to other participants in the VR environment.

In some embodiments, system 300 may employ VR-based second-factor authentication techniques to facilitate auto-provision of a service, or purchase a product, associated with an interactive option and associated engagement option(s). For example, upon receiving selection of a personalized engagement option, system 300 may facilitate auto-provision of the service or purchase a product on behalf of the user. In some embodiments, system 300 may score each of the engagement options based on the above-mentioned techniques and select the highest-scoring engagement options, and auto-activate a URL for provision a service or ordering a product on behalf of the user. For certain types of engagement options (e.g., option requiring payment of more than a threshold amount, such as, for example, $100), second-factor authentication may be configured. For example, the second-factor authentication in the VR environment can be a preconfigured movement of a VR controller device or a signature move of the avatar in the VR environment or any other suitable VR-related movement or input. For different VR environments, users can set different signature moves (e.g., for a war game environment, a specific pattern of moving the sword may be used as a signature). System 300 may additionally or alternatively use VR-specific authentication systems for second-factor authentication. In some embodiments, the digital twin of a mobile device in the VR environment can be used as a second factor authenticator, e.g., if the real-world counterpart of the virtual mobile device is within a certain proximity to the VR device.

While VR environments have been discussed herein, in some circumstances, the aspects disclosed herein may be implemented in connection with an extended reality (XR) environment. XR may be understood as VR, augmented reality (AR), or mixed reality (MR) or any combination thereof. AR systems may provide a modified version of reality, such as enhanced information overlaid over real-world objects. MR systems map interactive virtual objects to the real world. Such systems may utilize wearables, such as a head-mounted device, comprising a stereoscopic display, or smart glasses. For example, the techniques described herein may be usable to generate or modify supplemental content (e.g., an advertisement on a back of a bus) based on user preferences in an AR environment and provide personalized engagement options in connection with such supplemental content.

Figure 5:
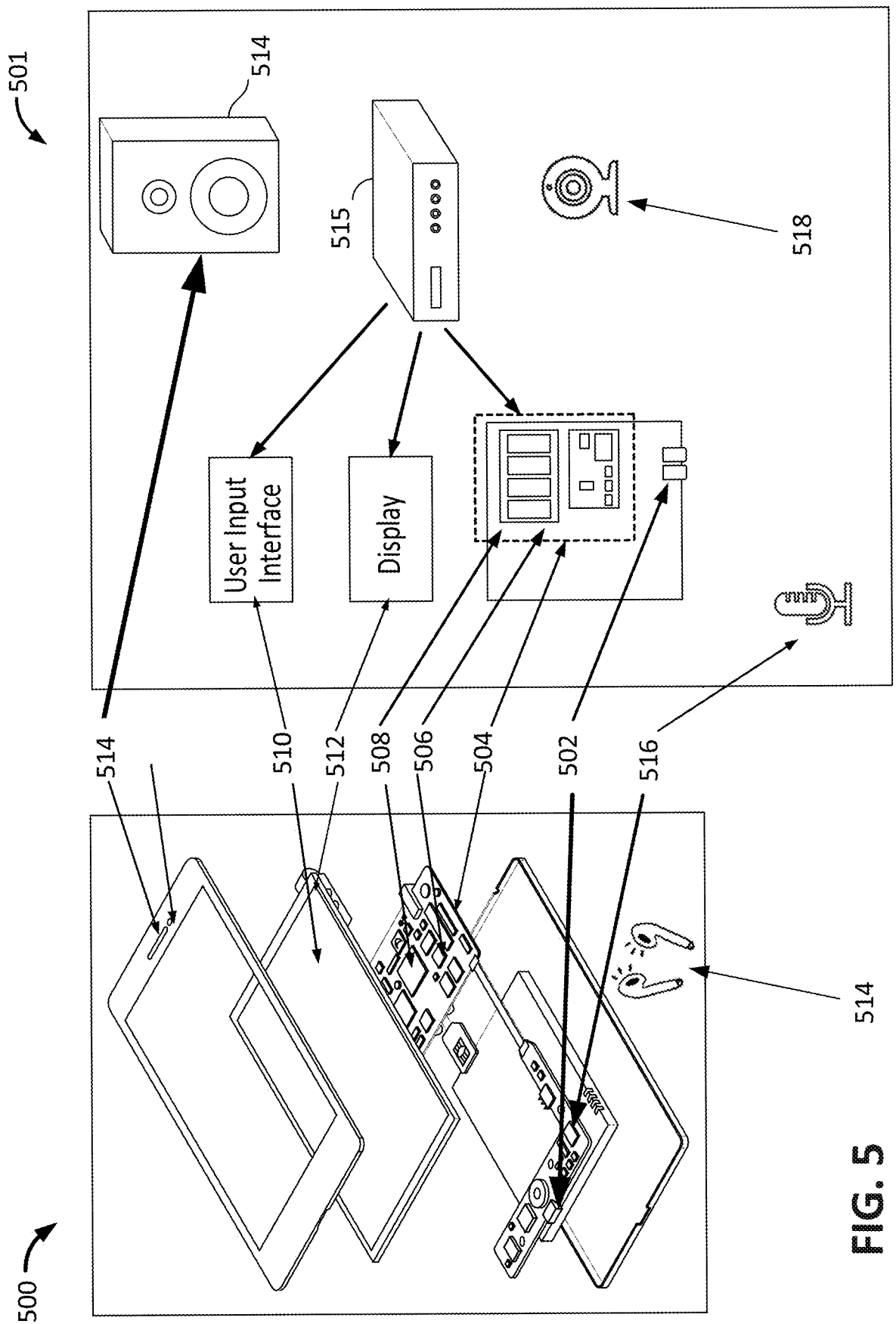
FIGS. 5-6 show illustrative devices, systems, servers, and related hardware for providing personalized engagement options in a VR environment, in accordance with some embodiments of the present disclosure.
Figure 6:
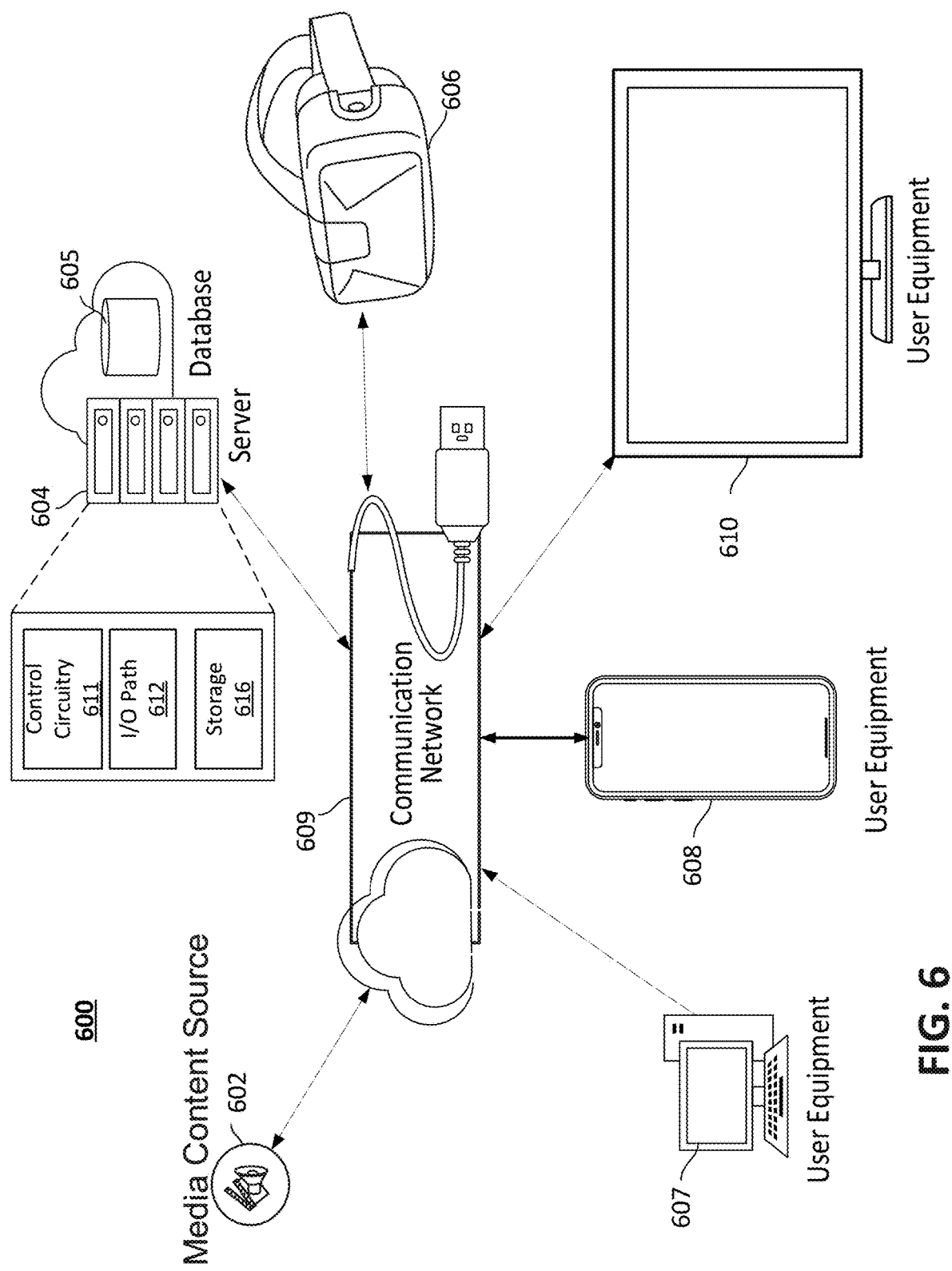

FIGS. 5-6 describe illustrative devices, systems, servers, and related hardware for providing personalized engagement options in a VR environment, in accordance with some embodiments of the present disclosure. FIG. 5 shows generalized embodiments of illustrative user devices 500 and 501, which may correspond to, e.g., VR device 103 of FIG. 1 and/or second device 202 of FIG. 2. For example, user device 500 may be a smartphone device, a tablet, a near-eye display device, a VR device, or any other suitable device capable of participating in a VR environment, e.g., locally or over a communication network. In another example, user device 501 may be a user television equipment system or device. User device 501 may include set-top box 515. Set-top box 515 may be communicatively connected to microphone 516, audio output equipment (e.g., speaker or headphones 514), and display 512. In some embodiments, microphone 516 may receive audio corresponding to a voice of a video conference participant and/or ambient audio data during a video conference. In some embodiments, display 512 may be a television display or a computer display. In some embodiments, set-top box 515 may be communicatively connected to user input interface 510. In some embodiments, user input interface 510 may be a remote-control device. Set-top box 515 may include one or more circuit boards. In some embodiments, the circuit boards may include control circuitry, processing circuitry, and storage (e.g., RAM, ROM, hard disk, removable disk, etc.). In some embodiments, the circuit boards may include an input/output path. More specific implementations of user devices are discussed below in connection with FIG. 6. In some embodiments, device 500 may comprise any suitable number of sensors (e.g., gyroscope or gyrometer, or accelerometer, etc.), and/or a GPS module (e.g., in communication with one or more servers and/or cell towers and/or satellites) to ascertain a location of device 500. In some embodiments, device 500 comprises a rechargeable battery that is configured to provide power to the components of the device.

Each one of user device 500 and user device 501 may receive content and data via input/output (I/O) path 502. I/O path 502 may provide content (e.g., broadcast programming, on-demand programming, internet content, content available over a local area network (LAN) or wide area network (WAN), and/or other content) and data to control circuitry 504, which may comprise processing circuitry 506 and storage 508. Control circuitry 504 may be used to send and receive commands, requests, and other suitable data using I/O path 502, which may comprise I/O circuitry. I/O path 502 may connect control circuitry 504 (and specifically processing circuitry 506) to one or more communications paths (described below). I/O functions may be provided by one or more of these communications paths, but are shown as a single path in FIG. 5 to avoid overcomplicating the drawing. While set-top box 515 is shown in FIG. 5 for illustration, any suitable computing device having processing circuitry, control circuitry, and storage may be used in accordance with the present disclosure. For example, set-top box 515 may be replaced by, or complemented by, a personal computer (e.g., a notebook, a laptop, a desktop), a smartphone (e.g., device 500), an VR device, a tablet, a network-based server hosting a user-accessible client device, a non-user-owned device, any other suitable device, or any combination thereof.

Control circuitry 504 may be based on any suitable control circuitry such as processing circuitry 506. As referred to herein, control circuitry should be understood to mean circuitry based on one or more microprocessors, microcontrollers, digital signal processors, programmable logic devices, field-programmable gate arrays (FPGAs), application-specific integrated circuits (ASICs), etc., and may include a multi-core processor (e.g., dual-core, quad-core, hexa-core, or any suitable number of cores) or supercomputer. In some embodiments, control circuitry may be distributed across multiple separate processors or processing units, for example, multiple of the same type of processing units (e.g., two Intel Core i7 processors) or multiple different processors (e.g., an Intel Core i5 processor and an Intel Core i7 processor). In some embodiments, control circuitry 504 executes instructions for the VR application stored in memory (e.g., storage 508). Specifically, control circuitry 504 may be instructed by the VR application to perform the functions discussed above and below. In some implementations, processing or actions performed by control circuitry 504 may be based on instructions received from the VR application.

In client/server-based embodiments, control circuitry 504 may include communications circuitry suitable for communicating with a server or other networks or servers. The VR application may be a stand-alone application implemented on a device or a server. The VR application may be implemented as software or a set of executable instructions. The instructions for performing any of the embodiments discussed herein of the VR application may be encoded on non-transitory computer-readable media (e.g., a hard drive, random-access memory on a DRAM integrated circuit, read-only memory on a BLU-RAY disk, etc.). For example, in FIG. 5, the instructions may be stored in storage 508, and executed by control circuitry 504 of a device 500.

In some embodiments, the VR application may be a client/server application where only the client application resides on device 500 (e.g., VR device 103 of FIG. 1), and a server application resides on an external server (e.g., server 604 and/or media content source 602). For example, the VR application may be implemented partially as a client application on control circuitry 504 of device 500 and partially on server 604 as a server application running on control circuitry 611. Server 604 may be a part of a local area network with one or more of devices 500, 501 or may be part of a cloud computing environment accessed via the internet. In a cloud computing environment, various types of computing services for performing searches on the internet or informational databases, providing video communication capabilities, providing storage (e.g., for a database) or parsing data are provided by a collection of network-accessible computing and storage resources (e.g., server 604 and/or an edge computing device), referred to as "the cloud." Device 500 may be a cloud client that relies on the cloud computing capabilities from server 604 to generate personalized engagement options in a VR environment. The client application may instruct control circuitry 504 to generate personalized engagement options in a VR environment.

Control circuitry 504 may include communications circuitry suitable for communicating with a server, edge computing systems and devices, a table or database server, or other networks or servers. The instructions for carrying out the above mentioned functionality may be stored on a server (which is described in more detail in connection with FIG. 6). Communications circuitry may include a cable modem, an integrated services digital network (ISDN) modem, a digital subscriber line (DSL) modem, a telephone modem, Ethernet card, or a wireless modem for communications with other equipment, or any other suitable communications circuitry. Such communications may involve the internet or any other suitable communication networks or paths (which is described in more detail in connection with FIG. 6). In addition, communications circuitry may include circuitry that enables peer-to-peer communication of user devices, or communication of user devices in locations remote from each other (described in more detail below).

Memory may be an electronic storage device provided as storage 508 that is part of control circuitry 504. As referred to herein, the phrase "electronic storage device" or "storage device" should be understood to mean any device for storing electronic data, computer software, or firmware, such as random-access memory, read-only memory, hard drives, optical drives, digital video disc (DVD) recorders, compact disc (CD) recorders, BLU-RAY disc (BD) recorders, BLU-RAY 3D disc recorders, digital video recorders (DVR, sometimes called a personal video recorder, or PVR), solid state devices, quantum storage devices, gaming consoles, gaming media, or any other suitable fixed or removable storage devices, and/or any combination of the same. Storage 508 may be used to store various types of content described herein as well as VR application data described above. Nonvolatile memory may also be used (e.g., to launch a boot-up routine and other instructions). Cloud-based storage, described in relation to FIG. 5, may be used to supplement storage 508 or instead of storage 508.

Control circuitry 504 may include video generating circuitry and tuning circuitry, such as one or more analog tuners, one or more MPEG-2 decoders or MPEG-2 decoders or decoders or HEVC decoders or any other suitable digital decoding circuitry, high-definition tuners, or any other suitable tuning or video circuits or combinations of such circuits. Encoding circuitry (e.g., for converting over-the-air, analog, or digital signals to MPEG or HEVC or any other suitable signals for storage) may also be provided. Control circuitry 504 may also include scaler circuitry for upconverting and downconverting content into the preferred output format of user device 500. Control circuitry 504 may also include digital-to-analog converter circuitry and analog-to-digital converter circuitry for converting between digital and analog signals. The tuning and encoding circuitry may be used by user device 500, 501 to receive and to display, to play, or to record content. The tuning and encoding circuitry may also be used to receive video communication session data. The circuitry described herein, including for example, the tuning, video generating, encoding, decoding, encrypting, decrypting, scaler, and analog/ digital circuitry, may be implemented using software running on one or more general purpose or specialized processors. Multiple tuners may be provided to handle simultaneous tuning functions (e.g., watch and record functions, picture-in-picture (PIP) functions, multiple-tuner recording, etc.). If storage 508 is provided as a separate device from user device 500, the tuning and encoding circuitry (including multiple tuners) may be associated with storage 508.

Control circuitry 504 may receive instruction from a user by way of user input interface 510. User input interface 510 may be any suitable user interface, such as a remote control, mouse, trackball, keypad, keyboard, touch screen, touchpad, stylus input, joystick, voice recognition interface, or other user input interfaces. Display 512 may be provided as a stand-alone device or integrated with other elements of each one of user device 500 and user device 501. For example, display 512 may be a touchscreen or touch-sensitive display. In such circumstances, user input interface 510 may be integrated with or combined with display 512. In some embodiments, user input interface 510 includes a remote-control device having one or more microphones, buttons, keypads, any other components configured to receive user input or combinations thereof. For example, user input interface 510 may include a handheld remote-control device having an alphanumeric keypad and option buttons. In a further example, user input interface 510 may include a handheld remote-control device having a microphone and control circuitry configured to receive and identify voice commands and transmit information to set-top box 515.

Audio output equipment 514 may be integrated with or combined with display 512. Display 512 may be one or more of a monitor, a television, a liquid crystal display (LCD) for a mobile device, amorphous silicon display, low-temperature polysilicon display, electronic ink display, electrophoretic display, active matrix display, electro-wetting display, electro-fluidic display, cathode ray tube display, light-emitting diode display, electroluminescent display, plasma display panel, high-performance addressing display, thin-film transistor display, organic light-emitting diode display, surface-conduction electron-emitter display (SED), laser television, carbon nanotubes, quantum dot display, interferometric modulator display, or any other suitable equipment for displaying visual images. A video card or graphics card may generate the output to the display 512. Audio output equipment 514 may be provided as integrated with other elements of each one of device 500 and device 501 or may be stand-alone units. An audio component of videos and other content displayed on display 512 may be played through speakers (or headphones) of audio output equipment 514. In some embodiments, audio may be distributed to a receiver (not shown), which processes and outputs the audio via speakers of audio output equipment 514. In some embodiments, for example, control circuitry 504 is configured to provide audio cues to a user, or other audio feedback to a user, using speakers of audio output equipment 514. There may be a separate microphone 516 or audio output equipment 514 may include a microphone configured to receive audio input such as voice commands or speech. For example, a user may speak letters or words that are received by the microphone and converted to text by control circuitry 504. In a further example, a user may voice commands that are received by a microphone and recognized by control circuitry 504. Camera 518 may be any suitable video camera integrated with the equipment or externally connected. Camera 518 may be a digital camera comprising a charge-coupled device (CCD) and/or a complementary metal-oxide semiconductor (CMOS) image sensor. Camera 518 may be an analog camera that converts to digital images via a video card.

The VR application may be implemented using any suitable architecture. For example, it may be a stand-alone application wholly implemented on each one of user device 500 and user device 501. In such an approach, instructions of the application may be stored locally (e.g., in storage 508), and data for use by the application is downloaded on a periodic basis (e.g., from an out-of-band feed, from an internet resource, or using another suitable approach). Control circuitry 504 may retrieve instructions of the application from storage 508 and process the instructions to provide video conferencing functionality and generate any of the displays discussed herein. Based on the processed instructions, control circuitry 504 may determine what action to perform when input is received from user input interface 510. For example, movement of a cursor on a display up/down may be indicated by the processed instructions when user input interface 510 indicates that an up/down button was selected. An application and/or any instructions for performing any of the embodiments discussed herein may be encoded on computer-readable media. Computer-readable media includes any media capable of storing data. The computer-readable media may be non-transitory including, but not limited to, volatile and non-volatile computer memory or storage devices such as a hard disk, floppy disk, USB drive, DVD, CD, media card, register memory, processor cache, Random Access Memory (RAM), etc.

Control circuitry 504 may allow a user to provide user profile information or may automatically compile user profile information. For example, control circuitry 504 may access and monitor network data, video data, audio data, processing data, participation data from a conference participant profile. Control circuitry 504 may obtain all or part of other user profiles that are related to a particular user (e.g., via social media networks), and/or obtain information about the user from other sources that control circuitry 504 may access. As a result, a user can be provided with a unified experience across the user's different devices.

In some embodiments, the VR application is a client/server-based application. Data for use by a thick or thin client implemented on each one of user device 500 and user device 501 may be retrieved on-demand by issuing requests to a server remote to each one of user device 500 and user device 501. For example, the remote server may store the instructions for the application in a storage device. The remote server may process the stored instructions using circuitry (e.g., control circuitry 504) and generate the displays discussed above and below. The client device may receive the displays generated by the remote server and may display the content of the displays locally on device 500. This way, the processing of the instructions is performed remotely by the server while the resulting displays (e.g., that may include text, a keyboard, or other visuals) are provided locally on device 500. Device 500 may receive inputs from the user via input interface 510 and transmit those inputs to the remote server for processing and generating the corresponding displays. For example, device 500 may transmit a communication to the remote server indicating that an up/down button was selected via input interface 510. The remote server may process instructions in accordance with that input and generate a display of the application corresponding to the input (e.g., a display that moves a cursor up/down). The generated display is then transmitted to device 500 for presentation to the user.

In some embodiments, the VR application may be downloaded and interpreted or otherwise run by an interpreter or virtual machine (run by control circuitry 504). In some embodiments, the VR application may be encoded in the ETV Binary Interchange Format (EBIF), received by control circuitry 504 as part of a suitable feed, and interpreted by a user agent running on control circuitry 504. For example, the VR application may be an EBIF application. In some embodiments, the VR application may be defined by a series of JAVA-based files that are received and run by a local virtual machine or other suitable middleware executed by control circuitry 504. In some of such embodiments (e.g., those employing MPEG-2, MPEG-4, HEVC or any other suitable digital media encoding schemes), VR application may be, for example, encoded and transmitted in an MPEG-2 object carousel with the MPEG audio and video packets of a program.

FIG. 6 is a diagram of an illustrative system 600 for enabling user-controlled extended reality, in accordance with some embodiments of this disclosure. User devices 606, 607, 608, 610 (which may correspond to, e.g., VR device 103 of FIG. 1) may be coupled to communication network 609. Communication network 609 may be one or more networks including the internet, a mobile phone network, mobile voice or data network (e.g., a 5G, 4G, or LTE network), cable network, public switched telephone network, or other types of communication network or combinations of communication networks. Paths (e.g., depicted as arrows connecting the respective devices to the communication network 609) may separately or together include one or more communications paths, such as a satellite path, a fiber-optic path, a cable path, a path that supports internet communications (e.g., IPTV), free-space connections (e.g., for broadcast or other wireless signals), or any other suitable wired or wireless communications path or combination of such paths. Communications with the client devices may be provided by one or more of these communications paths but are shown as a single path in FIG. 6 to avoid overcomplicating the drawing.

Although communications paths are not drawn between user devices, these devices may communicate directly with each other via communications paths as well as other short-range, point-to-point communications paths, such as USB cables, IEEE 1394 cables, wireless paths (e.g., Bluetooth, infrared, IEEE 702-11x, etc.), or other short-range communication via wired or wireless paths. The user devices may also communicate with each other directly through an indirect path via communication network 609.

System 600 may comprise media content source 602, one or more servers 604, and/or one or more edge computing devices. In some embodiments, the VR application may be executed at one or more of control circuitry 611 of server 604 (and/or control circuitry of user devices 606, 607, 608, 610 and/or control circuitry of one or more edge computing devices). In some embodiments, the media content source and/or server 604 may be configured to host or otherwise facilitate video communication sessions between user devices 606, 607, 608, 610 and/or any other suitable user devices, and/or host or otherwise be in communication (e.g., over network 609) with one or more social network services.

In some embodiments, server 604 may include control circuitry 611 and storage 616 (e.g., RAM, ROM, Hard Disk, Removable Disk, etc.). Storage 616 may store one or more databases 605. Server 604 may also include an I/O path 612. I/O path 612 may provide video conferencing data, device information, or other data, over a local area network (LAN) or wide area network (WAN), and/or other content and data to control circuitry 611, which may include processing circuitry, and storage 616. Control circuitry 611 may be used to send and receive commands, requests, and other suitable data using I/O path 612, which may comprise I/O circuitry. I/O path 612 may connect control circuitry 611 (and specifically control circuitry) to one or more communications paths.

Control circuitry 611 may be based on any suitable control circuitry such as one or more microprocessors, microcontrollers, digital signal processors, programmable logic devices, field-programmable gate arrays (FPGAs), application-specific integrated circuits (ASICs), etc., and may include a multi-core processor (e.g., dual-core, quad-core, hexa-core, or any suitable number of cores) or supercomputer. In some embodiments, control circuitry 611 may be distributed across multiple separate processors or processing units, for example, multiple of the same type of processing units (e.g., two Intel Core i7 processors) or multiple different processors (e.g., an Intel Core i5 processor and an Intel Core i7 processor). In some embodiments, control circuitry 611 executes instructions for an emulation system application stored in memory (e.g., the storage 616). Memory may be an electronic storage device provided as storage 616 that is part of control circuitry 611.

Figure 7:
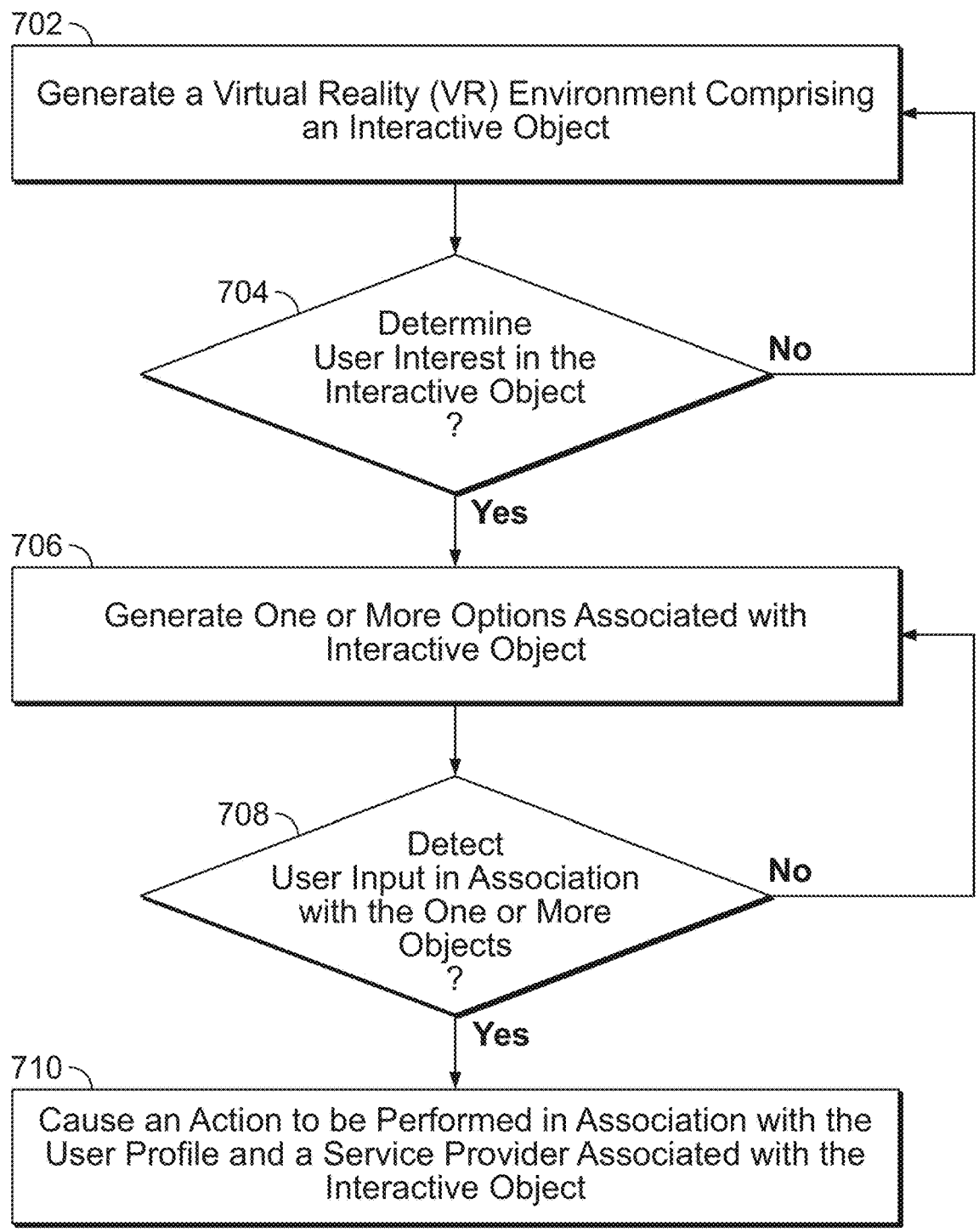
FIG. 7 is a flowchart of a detailed illustrative process for providing personalized engagement options in a VR environment, in accordance with some embodiments of this disclosure, in accordance with some embodiments of this disclosure.

FIG. 7 is a flowchart of a detailed illustrative process 700 for providing personalized engagement options in a VR environment, in accordance with some embodiments of this disclosure. In various embodiments, the individual steps of process 700 may be implemented by one or more components of the devices and systems of FIGS. 1-6 and may be performed in combination with any of the other processes and aspects described herein. Although the present disclosure may describe certain steps of process 700 (and of other processes described herein) as being implemented by certain components of the devices and systems of FIGS. 1-6, this is for purposes of illustration only. It should be understood that other components of the devices and systems of FIGS. 1-6 may implement those steps instead.

At 702, control circuitry (e.g., control circuitry 504 of VR device 103 and/or control circuitry 611 of server 604) may generate a VR environment (e.g., VR environment 100 of FIG. 1) comprising an interactive object (e.g., object 104 corresponding to an advertisement for "Space Wars"). The interactive object may be associated with a service provider (e.g., Hulu) and may be generated based on a user profile associated with a current VR session in the VR environment. For example, the user profile may correspond to a profile of user 102 with the VR application and/or a master account that may operate as a pass-through account and may be linked to the VR user profile and any suitable number of other profiles and/or subscriptions associated with user 102. As an example, interactive object 104 may be generated based on the user profile of user 102 indicating that the user has previously consumed science fiction films with the same or different service providers, the user has indicated interest in outer space or science fiction, or the user has visited websites or applications associated with "Space Wars" or science fiction, or any other suitable factor, or any combination thereof.

In some embodiments, step 702 may comprise a content presenter (e.g., an advertiser) causing supplemental content (e.g., an advertisement) to be generated for presentation in the VR environment (e.g., VR environment 100 of FIG. 1). For example, the advertiser may instruct the VR application to insert interactive object 104 in VR environment 100, or the VR application may have an arrangement with the advertiser to provide such advertisements, or the VR application and the advertiser may be associated with the same entity.

At 704, the control circuitry (e.g., control circuitry 504 of VR device 103 and/or control circuitry 611 of server 604) may determine whether the user (e.g., the user specified at 102 of FIG. 1) is interested in the interactive object (e.g., object 104 of FIG. 1). In some embodiments, user interest may be determined at least in part based on whether a hidden code or QR code embedded with the content is scanned by the user through eye gaze, and/or upon determining the avatar is proximate to or within a threshold distance from the content (e.g., for a threshold period of time), or based on using a digital twin mobile device within the VR environment having a code scanning feature (e.g., a QR code reader). In some embodiments, the interactive object may be generated at a portion of the VR environment based on such determinations, e.g., on a wall in the VR environment if user gaze is detected at the wall for at least a threshold period of time. In some embodiments, a user may be determined to be interested in an interactive object upon determining that such object is in the user's FOV or gaze or based on other received input, since the object may have been generated based on a user preference indicated in the user's profile and thus the user may be assumed to be interested in such object. In some embodiments, the VR application (e.g., executing at least in part at VR device 103) may read the QR code or activate a URL when a user's avatar is in visual proximity to interactive object 104. If user interest is determined, processing may proceed to 706; otherwise processing may return to 702 or remain at 704.

At 706, the control circuitry may generate one or more options (e.g., 114 and 116, or 120, 122 and 124 of FIG. 1) associated with the interactive object (e.g., object 104 of FIG. 1). In some embodiments, the control circuitry may retrieve or access user profile data of the user (e.g., specified at 102 of FIG. 1). In some embodiments, the user profile data may be stored in association with a user profile of the user with the VR application or a master account associated with a plurality of user profiles or subscriptions. In some embodiments, the VR application may request and receive user profile data from a third party (e.g., third-party service provider 316). In some embodiments, the control circuitry may use similar data and techniques to generate the interactive option(s) as used in 702 to determine a suitable interactive object (e.g., associated with an advertisement of a third-party service provider). In some embodiments, the user profile data may comprise or correspond to user activity data, e.g., current data as detected by sensors (e.g., on-board sensors 314), may reference historical data, or may determine predicted movements or activities of the user within the VR environment. In some embodiments, the control circuitry may generate the one or more personalized engagement options based on one or more of user profile data, activity data and historical engagement patterns.

In some embodiments, the control circuitry may cause the one or more personalized engagement options to be generated at a second device (e.g., device 202 of FIG. 2) in addition or alternative to being generated at VR device 103. In some embodiments, the control circuitry may push the personalized engagement options to the content presenter (e.g., a streaming provider or VR provider or advertiser), which may in turn present such options within the VR environment, or locally broadcast the engagement options for presentation on a paired device. (e.g., device 202 of FIG. 2) in addition or alternative to being generated at VR device 103.

At 708, the control circuitry may determine whether user input is detected in association with one or more options (e.g., 114 and 116, or 120, 122 and 124 of FIG. 1) associated with the interactive object (e.g., object 104 of FIG. 1). The control circuitry may detect user input in association with the one or more options associated with interactive object 104. For example, the VR application may receive selection of option 114 or option 116 via a user gesture, e.g., touch input, detecting the user motioning towards the option, voice input, user gaze, biometric input, detecting the option is in the gaze or FOV of the user for a threshold period of time, determining the user is within a threshold virtual distance from the option, or based on any other suitable input or any suitable combination thereof. If user input in association with the one or more options is detected, processing may proceed to 710; otherwise processing may return to 706 or remain at 708.

In some embodiments, if multiple options are present, the options may be ranked based on the option the user is determined to be most likely to select, given the user's historical engagement patterns, user profile data and/or activity data. In some embodiments, as the user's avatar moves through the VR environment, the user may be presented with various different opportunities to interact with interactive objects and associated selectable options. In some embodiments, if no user input is detected with the one or more options or the interactive object associated with such option(s) for a threshold period of time (e.g., 30 seconds), a new interactive object and/or associated option(s) may be generated in place of the prior object and options, or the prior object and options may cease to be generated for display.

At 710, the control circuitry may, based on detecting the user input at 708, cause an action to be performed in association with the user profile (e.g., of User A specified at 102 of FIG. 1) and a service provider associated with the interactive object. In some embodiments, such action may comprise accessing a service (e.g., the Hulu streaming service) associated with the service provider (e.g., Hulu) and such service may be external to VR environment 100. In some embodiments, such action may be performed or caused to be performed based on the input received in association with VR environment 100 without the need for User B to disconnect or disengage from VR environment 100. For example, the VR application may cause a free trial of "Space Wars," associated with Hulu streaming session and option 114 or 116, to be launched at one or more devices other than VR device 103 (or be played at VR device 103 instead of VR environment 100). In some embodiments, the action that the VR application causes to be performed may correspond to updating a service user profile or master profile or VR application user profile associated with User A, e.g., with an indication of an interest in "Space Wars" associated with object 104, or to schedule a viewing of the free trial of "Space Wars" at a later time.

Figure 8:
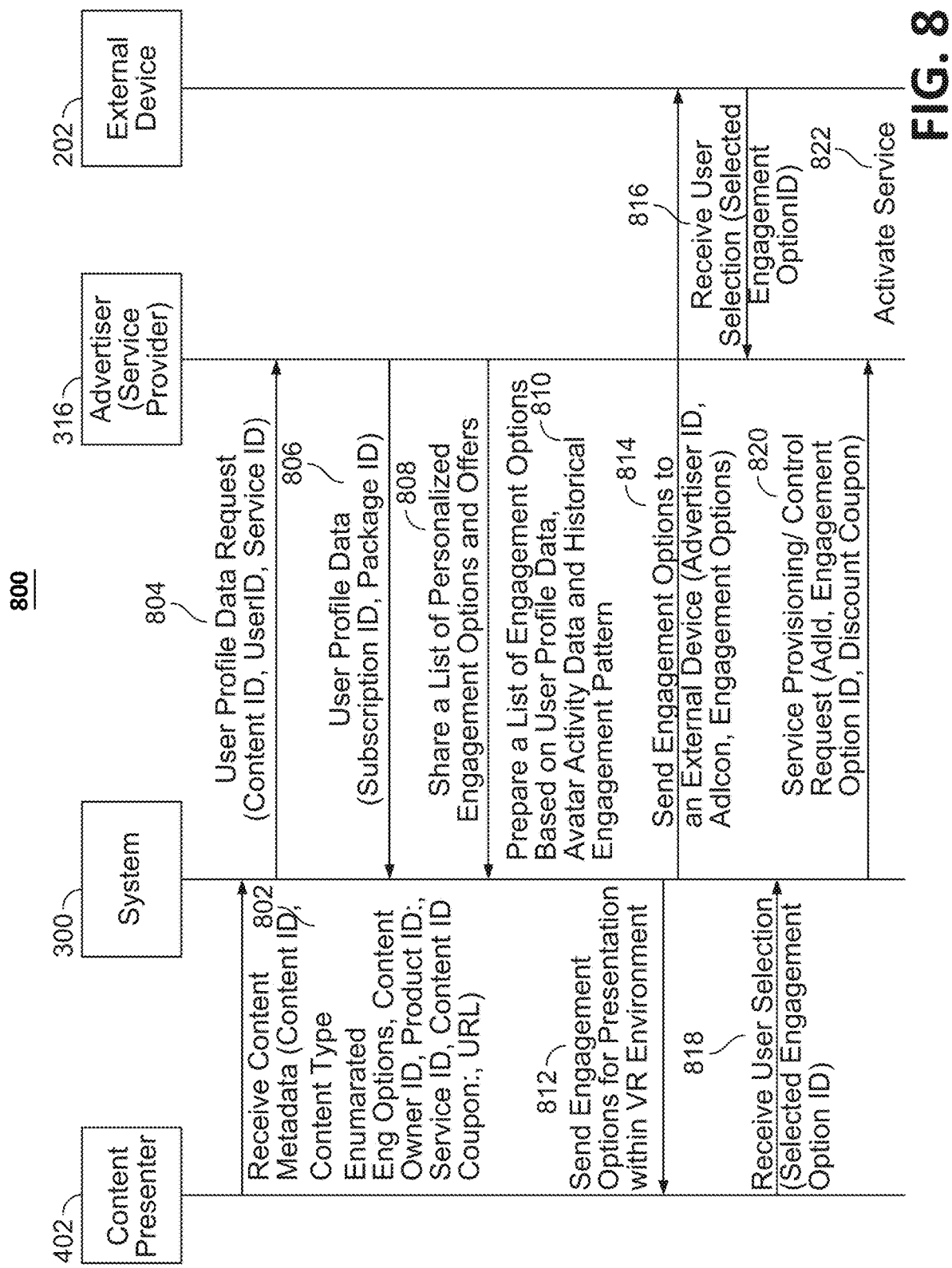
FIG. 8 is a flowchart for providing personalized engagement options in a VR environment, in accordance with some embodiments of this disclosure.

FIG. 8 is a flowchart of a detailed illustrative process 800 for providing personalized engagement options in a VR environment, in accordance with some embodiments of this disclosure. In various embodiments, the individual steps of process 800 may be implemented by one or more components of the devices and systems of FIGS. 1-6 and may be performed in combination with any of the other processes and aspects described herein. Although the present disclosure may describe certain steps of process 800 (and of other processes described herein) as being implemented by certain components of the devices and systems of FIGS. 1-6, this is for purposes of illustration only. It should be understood that other components of the devices and systems of FIGS. 1-6 may implement those steps instead.

At 802, control circuitry (e.g., control circuitry 504 of VR device 103 and/or control circuitry 611 of server 604), which may be included in system 300 of FIG. 3, may receive content metadata from a content presenter (e.g., a streaming provider or a VR environment provider or an advertiser). In some embodiments, the content presenter may be considered part of or external to system 300. In some embodiments, the content metadata may comprise information associated with the following fields: ContentID; ContentType: (e.g. service, product, mediacontent); Product company ID/service provider ID/content provider ID; Enumerated engagement options (EP1, EP2, EP3, . . . EPn); Content relevance expiry time; ProductID; ServiceID; ContentID; Coupon; URL, or any other suitable information, or any combination thereof.

At 804, system 300 may request from a service provider (e.g., an advertiser) 316 user profile data, such as, for example, ContentID associated with an interactive object (e.g., object 104 of FIG. 1), UserID associated with a current user (e.g., the user specified at 102 of FIG. 1) and ServiceID associated with service provider 316. At 806, system 300 may receive user profile data, such as, for example, an indication of whether a user is a subscriber of service provider 316, and if so, a subscription ID and a package ID (e.g., the services or portions of services provided by service provider 316 that the user is entitled to access).

At 808, system 300 may receive from service provider 316 a list of personalized engagement options and offers (e.g., options 114 and 116 if the user is not currently a subscriber of service provider 316, or options 120, 122 and 124 if the user is an existing subscriber of service provider 316). At 810, system 300 may be configured to generate one or more engagement options, based on the data received at 808, and based on one or more of user profile data, avatar activity data, and historical engagement patterns of the user within the VR environment and/or in other environments. At 812, such personalized engagement options may be transmitted for presentation at the content presenter, e.g., presented to the user at VR device 103. At 814, which may be performed in addition or alternative to 812, such personalized engagement options may be transmitted for presentation to an external device (e.g., second device 202 of FIG. 2)

At 816, service provider 316 may receive selection of one or more of the personalized engagement options from external device 202, and/or at 818, system 300 may receive selection from the user of VR device 103. At 820, system 300 may cause an action to be performed in association with the user profile and service provider 316, such as, for example, as described at 710 of FIG. 7. At 822, based on step 820, the action may be performed, e.g., by system 300 and/or service provider 316.

The processes discussed above are intended to be illustrative and not limiting. One skilled in the art would appreciate that the steps of the processes discussed herein may be omitted, modified, combined and/or rearranged, and any additional steps may be performed without departing from the scope of the invention. More generally, the above disclosure is meant to be illustrative and not limiting. Only the claims that follow are meant to set bounds as to what the present invention includes. Furthermore, it should be noted that the features described in any one embodiment may be applied to any other embodiment herein, and flowcharts or examples relating to one embodiment may be combined with any other embodiment in a suitable manner, done in different orders, or done in parallel. In addition, the systems and methods described herein may be performed in real time. It should also be noted that the systems and/or methods described above may be applied to, or used in accordance with, other systems and/or methods.

What is claimed is:

1. A computer-implemented method comprising:
generating, for display at a device, a virtual reality (VR) environment provided via a VR application, wherein the VR environment comprises an interactive object associated with a service provider, wherein the interactive object is generated for display based on a user profile of a user associated with a current VR session in the VR environment prior to receiving user interface input from the user requesting to access a service of the service provider associated with the interactive object to be generated for display;
detecting the user interface input to access the service of the service provider based on a selection of an option associated with the interactive object, wherein the option is displayed in the VR environment; and
based on the detecting, causing an action to be performed in association with the user profile and the service provider associated with the interactive object, wherein the action comprises:
exiting out of the VR application providing the VR environment; and
accessing the service provided by the service provider by generating for display an application provided by the service provider, the service being external to the VR environment and the application being distinct from the VR application.

2. The method of claim 1, further comprising:
determining whether the user profile is subscribed to the service provider; and
in response to determining that the user profile is subscribed to the service provider, generating the interactive object by generating for display one or more options associated with the interactive object and available to a subscriber of the service provider.

3. The method of claim 2, further comprising:
in response to determining that the user profile is not subscribed to the service provider, generating the interactive object by generating for display one or more options associated with the interactive object and available to a non-subscriber of the service provider, wherein the one or more options available to the subscriber of the service provider are different from the one or more options available to the non-subscriber of the service provider.

4. The method of claim 3, wherein the service provider is a media asset provider, and the one or more options associated with the interactive object and available to the non-subscriber of the service provider comprise at least one of an option to subscribe to the service provider, a first free trial option to consume a media asset with one or more advertisements, or a second free trial option to consume the media asset without the one or more advertisements.

5. The method of claim 2, wherein determining that the user profile is subscribed to the service provider comprises identifying an indication in the user profile that the user associated with the user profile is subscribed to the service provider.

6. The method of claim 2, wherein the service provider is a media asset provider, and the one or more options associated with the interactive object and available to the subscriber of the service provider comprise at least one of an option to consume a media asset associated with the interactive object, an option to consume a preview of a media asset, an option to record the media asset, or an option to associate the media asset with the user profile.

7. The method of claim 1, wherein the device is a first device of the user, wherein the VR environment is generated for display at the first device, and wherein the option associated with the interactive object is generated for display at a second device of the user that is different from the first device.

8. The method of claim 1, wherein generating the option associated with the interactive object is performed in response to determining that an avatar associated with the user profile in the VR environment is proximate to the interactive object and/or in response to determining that a gaze is directed at the interactive object.

9. The method of claim 1, wherein detecting the user interface input comprises receiving voice input and determining the voice input relates to the interactive object in the VR environment, and wherein the VR environment includes an avatar associated with the user profile and the current VR session of the VR environment includes a plurality of other avatars associated with other user profiles, and the voice input is not shared with the plurality of other avatars in response to determining the voice input relates to the interactive object.

10. The method of claim 1, wherein the device is a first device of the user, and wherein the VR environment is generated for display at the first device, and wherein the application associated with accessing the service is displayed on a second device of the user that is different than the first device.

11. The method of claim 1, wherein the option is displayed at a different portion of the VR environment than the interactive object, and wherein the interactive object is initially displayed at a first time prior to a second time at which the option is initially displayed.

12. The method of claim 1, wherein the option is a second option, and the second option is generated for display after a first option is ceased to be generated for display, wherein the first option is ceased to generated for display based at least in part on determining that the first option was generated for display for at least a threshold period of time without being interacted with.

13. A system comprising:
 memory;
 control circuitry configured to:
  generate, for display at a device, a virtual reality (VR) environment provided via a VR application, wherein the VR environment comprises an interactive object associated with a service provider, wherein the interactive object is generated for display based on a user profile of a user associated with a current VR session in the VR environment prior to receiving user interface input from the user requesting to access a service of the service provider associated with the interactive object to be generated for display, wherein the user profile is stored in the memory;
  detect the user interface input to access the service of the service provider based on a selection of an option associated with the interactive object, wherein the option is displayed in the VR environment; and
  based on the detecting, cause an action to be performed in association with the user profile and the service provider associated with the interactive object, wherein the action comprises:
   exiting out of the VR application providing the VR environment; and
   accessing the service provided by the service provider by generating for display an application provided by the service provider, the service being external to the VR environment and the application being distinct from the VR application.

14. The system of claim 13, wherein the control circuitry is further configured to:
 determine whether the user profile is subscribed to the service provider; and
 in response to determining that the user profile is subscribed to the service provider, generate the interactive object by generating for display one or more options associated with the interactive object and available to a subscriber of the service provider.

15. The system of claim 14, wherein the control circuitry is further configured to:
 in response to determining that the user profile is not subscribed to the service provider, generate the interactive object by generating for display one or more options associated with the interactive object and available to a non-subscriber of the service provider, wherein the one or more options available to the subscriber of the service provider are different from the one or more options available to the non-subscriber of the service provider.

16. The system of claim 15, wherein the service provider is a media asset provider, and the one or more options associated with the interactive object and available to the non-subscriber of the service provider comprise at least one of an option to subscribe to the service provider, a first free trial option to consume a media asset with one or more advertisements, or a second free trial option to consume the media asset without the one or more advertisements.

17. The system of claim 14, wherein the service provider is a media asset provider, and the one or more options associated with the interactive object and available to the subscriber of the service provider comprise at least one of an option to consume a media asset associated with the interactive object, an option to consume a preview of a media asset, an option to record the media asset, or an option to associate the media asset with the user profile.

18. The system of claim 13, wherein the device is a first device, wherein the control circuitry is configured to generate for display the VR environment at the first device, and wherein the control circuitry is configured to generate for display the option associated with the interactive object at a second device different from the first device.

19. The system of claim 13, wherein the control circuitry is configured to generate the option associated with the interactive object in response to determining that an avatar associated with the user profile in the VR environment is proximate to the interactive object and/or in response to determining that a gaze is directed at the interactive object.

20. The system of claim 13, wherein the control circuitry is configured to detect the user interface input by receiving voice input and determining the voice input relates to the interactive object in the VR environment, and wherein the VR environment includes an avatar associated with the user profile and the current VR session of the VR environment includes a plurality of other avatars associated with other user profiles, and the control circuitry is configured to cause the voice input not to be shared with the plurality of other avatars in response to determining the voice input relates to the interactive object.

* * * * *